(12) United States Patent
Ren

(10) Patent No.: US 12,494,856 B2
(45) Date of Patent: Dec. 9, 2025

(54) METHOD FOR DETECTING TYPE OF WIRELESS CHANNEL AND APPARATUS THEREFOR

(71) Applicant: DATANG MOBILE COMMUNICATIONS EQUIPMENT CO., LTD., Beijing (CN)

(72) Inventor: Bin Ren, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 397 days.

(21) Appl. No.: 18/267,611

(22) PCT Filed: Sep. 6, 2021

(86) PCT No.: PCT/CN2021/116793
§ 371 (c)(1),
(2) Date: Jun. 15, 2023

(87) PCT Pub. No.: WO2022/127205
PCT Pub. Date: Jun. 23, 2022

(65) Prior Publication Data
US 2024/0063930 A1    Feb. 22, 2024

(30) Foreign Application Priority Data
Dec. 16, 2020    (CN) .......................... 202011484919.4

(51) Int. Cl.
*H04B 17/391*    (2015.01)
*H04B 17/309*    (2015.01)

(52) U.S. Cl.
CPC ......... *H04B 17/391* (2015.01); *H04B 17/347* (2023.05)

(58) Field of Classification Search
CPC .. H04B 17/391; H04B 17/309; H04B 17/347; H04L 5/0051
See application file for complete search history.

(56) References Cited

U.S. PATENT DOCUMENTS

| | | | |
|---|---|---|---|
| 11,265,744 B2 * | 3/2022 | Soriaga | H04B 7/02 |
| 11,444,710 B2 * | 9/2022 | Bugos | H04B 17/23 |
| 11,658,798 B1 * | 5/2023 | Kratz | G01S 11/08 |
| | | | 375/368 |
| 11,770,197 B2 * | 9/2023 | Zhang | H04B 17/309 |
| | | | 382/103 |
| 11,914,050 B2 * | 2/2024 | Iyengar | H01Q 9/42 |
| 12,200,472 B2 * | 1/2025 | Ali | H04L 41/40 |

(Continued)

FOREIGN PATENT DOCUMENTS

| | | |
|---|---|---|
| CN | 1378392 A | 11/2002 |
| CN | 102223168 A | 10/2011 |

(Continued)

*Primary Examiner* — Hai V Nguyen
(74) *Attorney, Agent, or Firm* — Meunier Carlin & Curfman LLC

(57) ABSTRACT

A wireless channel type detection method and apparatus. The type of a channel can be identified on the basis of at least one of carrier phase slope consistency, a ratio of phase differences of carrier phases at different times, and a carrier path loss, i.e., the type of the channel is determined to be LOS transmission or NLOS transmission. Thus, the precision of positioning resolution can be effectively improved.

20 Claims, 14 Drawing Sheets

(56) References Cited

U.S. PATENT DOCUMENTS

| | | | |
|---|---|---|---|
| 2015/0245311 A1 | 8/2015 | Wang et al. | |
| 2016/0249316 A1 | 8/2016 | Kudekar et al. | |
| 2020/0229010 A1* | 7/2020 | Soriaga | G01S 5/02 |
| 2020/0366386 A1* | 11/2020 | Bugos | A61B 5/0022 |
| 2022/0190894 A1 | 6/2022 | Kamiya et al. | |
| 2022/0322297 A1* | 10/2022 | Cha | H04L 5/0051 |
| 2024/0183936 A1* | 6/2024 | Au | H04L 67/12 |
| 2024/0313870 A1* | 9/2024 | Li | H04B 7/22 |
| 2024/0319352 A1* | 9/2024 | Peng | G01S 5/10 |
| 2025/0063575 A1* | 2/2025 | Mohammad Soleymani | G01S 11/02 |

FOREIGN PATENT DOCUMENTS

| | | | |
|---|---|---|---|
| CN | 104467990 A | 3/2015 | |
| CN | 107547119 A | 1/2018 | |
| CN | 109934031 A | 6/2019 | |
| CN | 111770528 A | 10/2020 | |
| EP | 3695783 A1 * | 8/2020 | G06V 20/56 |
| EP | 3739356 A1 * | 11/2020 | B60L 50/20 |
| EP | 3869223 A1 * | 8/2021 | B60L 50/20 |
| EP | 3872520 A2 * | 9/2021 | G01S 13/765 |
| EP | 4518360 A1 * | 3/2025 | G01S 5/0205 |
| WO | 2014037687 A1 | 3/2014 | |
| WO | 2020217941 A1 | 10/2020 | |
| WO | WO-2022115041 A1 * | 6/2022 | H04B 1/7075 |

* cited by examiner

METHOD FOR DETECTING TYPE OF WIRELESS CHANNEL AND APPARATUS THEREFOR

CROSS REFERENCE TO RELATED APPLICATIONS

The present disclosure is a National Stage of International Application No. PCT/CN2021/116793, filed on Sep. 6, 2021, which claims the priority to Chinese Patent Application No. 202011484919.4, filed to China National Intellectual Property Administration on Dec. 16, 2020, both which are incorporated in their entirety herein by reference.

FIELD

The present disclosure relates to the technical field of radio communication, and in particular to a method for detecting a type of a wireless channel and an apparatus therefor.

BACKGROUND

Propagation conditions of a radio communication system are divided into line of sight (LOS) transmission and non-line of sight (NLOS) transmission. Under the line of sight, a radio signal is propagated "linearly" between a transmitting end and receiving end in an unshielded manner. Accordingly, it is required to eliminate any object that shields a radio wave from a first Fresnel zone, otherwise the signal strength will be dramatically reduced. Under the non-line of sight, a visual line between two communication points is blocked, and thus they cannot see each other, and over half of the Fresnel zone is blocked.

In a user terminal positioning system of radio communication, non-line of sight transmission is the critical factor that directly affects the positioning performance. Therefore, it is required to identify whether a signal transmission environment is a line of sight transmission environment or a non-line of sight transmission environment.

SUMMARY

Embodiments of the present disclosure provide a method for detecting a type of a wireless channel and an apparatus therefor, so as to identify line of sight transmission and non-line of sight transmission.

In a first aspect, provided is a method for detecting a type of a wireless channel. The method includes: detecting frequency domain channel responses of different sub-carriers of the same carrier or different carriers on the basis of a set signal; determining phases of correlation values, on the different sub-carriers of the same carrier or phases of correlation values, on the different carriers, of the frequency domain channel responses; transmitting detection results to a transmitting device of the set signal, wherein the detection results are used by the transmitting device to determine the type of the wireless channel; or, determining the type of the wireless channel according to slope consistency characteristics of the phases of the correlation values on the different sub-carriers of the same carrier or on the different carriers; where the type of the wireless channel includes line of sight transmission or non-line of sight transmission, and the detection results include at least one of the frequency domain channel responses, the phases, or the slope consistency characteristics.

In a second aspect, provided is a method for detecting a type of a wireless channel. The method includes: receiving detection results, wherein the detection results including: at least one of frequency domain channel responses, detected on the basis of a set signal, of different sub-carriers of the same carrier or frequency domain channel responses, detected on the basis of a set signal, of different carriers, phases, determined according to the frequency domain channel responses, of correlation values on the different sub-carriers of the same carrier or on the different carriers, or slope consistency characteristics of the phases of the correlation values; and determining the type of the wireless channel according to the detection results, the type of the wireless channel including line of sight transmission or non-line of sight transmission.

In a third aspect, provided is a method for detecting a type of a wireless channel. The method includes: detecting frequency domain channel responses, at different times, on a first signal carrier and frequency domain channel responses, at different times, on a second signal carrier on the basis of a set signal, wherein the first signal carrier and the second signal carrier includes: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; determining phases, at different times, on the first signal carrier and phases, at different times, on the second signal carrier according to the frequency domain channel responses; determining a first phase difference between the phases, at different times, on the first signal carrier according to the phases, at different times, on the first signal carrier, and determining a second phase difference between the phases, at different times, on the second signal carrier according to the phases, at different times, on the second signal carrier; transmitting detection results to a transmitting device of the set signal, wherein the detection results are used by the transmitting device to determine the type of the wireless channel; or, determining the type of the wireless channel according to a ratio of the first phase difference to the second phase difference; where the type of the wireless channel includes line of sight transmission or non-line of sight transmission, and the detection results include at least one of the frequency domain channel responses, the phases, the first phase difference, the second phase difference, or the ratio.

In a fourth aspect, provided is a method for detecting a type of a wireless channel. The method includes: receiving detection results, the detection results being configured for determining the type of the wireless channel and including at least one of frequency domain channel responses, detected on the basis of a set signal at different times, on a first signal carrier, frequency domain channel responses, detected on the basis of the set signal at different times, on a second signal carrier, phases, at different times, on the first signal carrier, phases, at different times, on the second signal carrier, a first phase difference between the phases, at different times, on the first signal carrier, a second phase difference, determined according to the phases at different times on the second signal carrier, between the phases, at different times, on the second signal carrier, or a ratio of the first phase difference to the second phase difference; the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; and determining the type of the wireless channel according to the detection results, the type of the wireless channel including line of sight transmission or non-line of sight transmission.

In a fifth aspect, provided is a method for detecting a type of a wireless channel. The method includes: detecting a first path loss of a first carrier and a second path loss of a second carrier on the basis of a set signal; transmitting detection results to a transmitting device of the set signal, wherein the detection results are used by the transmitting device to determine the type of the wireless channel; or, determining the type of the wireless channel according to a difference between the first path loss and the second path loss; where the type of the wireless channel includes line of sight transmission or non-line of sight transmission, and the detection results include the first path loss and the second path loss, and/or the difference between the first path loss and the second path loss.

In a sixth aspect, provided is a method for detecting a type of a wireless channel. The method includes: receiving detection results, the detection results including a first path loss, detected on the basis of a set signal, of a first carrier and a second path loss, detected on the basis of the set signal, of a second carrier, and/or a difference between the first path loss and the second path loss; and determining the type of the wireless channel according to the detection results, the type of the wireless channel including line of sight transmission or non-line of sight transmission.

In a seventh aspect, provided is a method for detecting a type of a wireless channel. The method includes: determining the type of the wireless channel through at least two of a first detection method, a second detection method, or a third detection method, the type of the wireless channel including line of sight transmission or non-line of sight transmission; determining the type of the wireless channel as line of sight transmission in response to determining that the type of the wireless channel determined through at least two of the first detection method, the second detection method, or the third detection method is line of sight transmission; or, determining the type of the wireless channel as non-line of sight transmission in response to determining that the type of the wireless channel determined through at least two of the first detection method, the second detection method, or the third detection method is non-line of sight transmission; where the first detection method includes: detecting frequency domain channel responses of different sub-carriers of the same carrier or different carriers on the basis of a set signal; determining phases of correlation values, on the different sub-carriers of the same carrier or phases of correlation values, on the different carriers, of the frequency domain channel responses; and determining the type of the wireless channel according to slope consistency characteristics of the phases of the correlation values on the different sub-carriers of the same carrier or on the different carriers; the second detection method includes: detecting frequency domain channel responses, at different times, on a first signal carrier and frequency domain channel responses, at different times, on a second signal carrier on the basis of a set signal, the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; determining phases, at different times, on the first signal carrier and phases, at different times, on the second signal carrier according to the frequency domain channel responses; determining a first phase difference between the phases, at different times, on the first signal carrier according to the phases, at different times, on the first signal carrier, and determining a second phase difference between the phases, at different times, on the second signal carrier according to the phases, at different times, on the second signal carrier; and determining the type of the wireless channel according to a ratio of the first phase difference to the second phase difference; and the third detection method includes: detecting a first path loss of a first carrier and a second path loss of a second carrier on the basis of a set signal; determining the type of the wireless channel according to a difference between the first path loss and the second path loss.

In an eighth aspect, provided is a communication device. The communication device includes: a detecting unit configured for detecting frequency domain channel responses of different sub-carriers of the same carrier or different carriers on the basis of a set signal; and a processing unit configured for determining phases of correlation values, on the different sub-carriers of the same carrier or on the different carriers, of the frequency domain channel responses, and determining a type of a wireless channel according to slope consistency characteristics of the phases of the correlation values on the different sub-carriers of the same carrier or on the different carriers, the type of the wireless channel including line of sight transmission or non-line of sight transmission.

In a ninth aspect, provided is a communication device. The communication device includes: a detecting unit configured for detecting frequency domain channel responses of different sub-carriers of the same carrier or different carriers on the basis of a set signal; and a transmitting unit configured for transmitting detection results to a transmitting device of the set signal, wherein the detection results are used by the transmitting device to determine a type of a wireless channel, the type of the wireless channel including line of sight transmission or non-line of sight transmission; where the detection results include at least one of the following: frequency domain channel responses, detected on the basis of a set signal, of different sub-carriers of the same carrier or frequency domain channel responses, detected on the basis of a set signal, of different carriers; phases, determined according to the frequency domain channel responses, of correlation values on the different sub-carriers of the same carrier or phases, determined according to the frequency domain channel responses, of correlation values on the different carriers; or slope consistency characteristics of the phases of the correlation values.

In a tenth aspect, provided is a communication device. The communication device includes: a receiving unit configured for receiving detection results, the detection results including: at least one of frequency domain channel responses, detected on the basis of a set signal, of different sub-carriers of the same carrier or frequency domain channel responses, detected on the basis of a set signal, of different carriers, phases, determined according to the frequency domain channel responses, of correlation values on the different sub-carriers of the same carrier or phases, determined according to the frequency domain channel responses, of correlation values on the different carriers, or slope consistency characteristics of the phases of the correlation values; and a processing unit configured for determining a type of a wireless channel according to the detection results, the type of the wireless channel including line of sight transmission or non-line of sight transmission.

In an eleventh aspect, provided is a communication device. The communication device includes: a detecting unit configured for detecting frequency domain channel responses, at different times, on a first signal carrier and frequency domain channel responses, at different times, on a second signal carrier on the basis of a set signal, the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; and a processing unit configured for determining phases, at different times, on the first signal carrier and phases, at different times, on the second signal carrier according to the frequency domain channel responses, determining a first phase difference between the phases, at different times, on the first signal carrier according to the phases, at different times, on the first signal carrier, determining a second phase difference between the phases, at different times, on the second signal carrier according to the phases, at different times, on the second signal carrier, and determining a type of a wireless channel according to a ratio of the first phase difference to the second phase difference, the type of the wireless channel including line of sight transmission or non-line of sight transmission.

In a twelfth aspect, provided is a communication device. The communication device includes: a detecting unit configured for detecting frequency domain channel responses, at different times, on a first signal carrier and frequency domain channel responses, at different times, on a second signal carrier on the basis of a set signal, the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; and a transmitting unit configured for transmitting detection results to a transmitting device of the set signal, wherein the detection results are used by the transmitting device to determine a type of a wireless channel, the type of the wireless channel including line of sight transmission or non-line of sight transmission; where the detection results include at least one of the following: the frequency domain channel responses, detected on the basis of the set signal at different times, on the first signal carrier and the frequency domain channel responses, detected on the basis of the set signal at different times, of the second signal carrier; phases, at different times, on the first signal carrier, phases, at different times, on the second signal carrier, a first phase difference between the phases, at different times, on the first signal carrier, and a second phase difference, determined according to the phases at different times on the second signal carrier, between the phases, at different times, on the second signal carrier; or a ratio of the first phase difference to the second phase difference; where the first signal carrier and the second signal carrier include: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna.

In a thirteenth aspect, provided is a communication device. The communication device includes: a receiving unit configured for receiving detection results, the detection results including at least one of frequency domain channel responses, detected on the basis of a set signal at different times, on a first signal carrier, frequency domain channel responses, detected on the basis of the set signal at different times, on a second signal carrier, phases, at different times, on the first signal carrier, phases, at different times, on the second signal carrier, a first phase difference between the phases, at different times, on the first signal carrier, a second phase difference, determined according to the phases at different times on the second signal carrier, between the phases, at different times, on the second signal carrier, or a ratio of the first phase difference to the second phase difference; the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; and a processing unit configured for determining a type of a wireless channel according to the detection results, the type of the wireless channel including line of sight transmission or non-line of sight transmission.

In a fourteenth aspect, provided is a communication device. The communication device includes: a detecting unit configured for detecting a first path loss of a first carrier and a second path loss of a second carrier on the basis of a set signal; and a processing unit configured for determining a type of a wireless channel according to a difference between the first path loss and the second path loss, the type of the wireless channel including line of sight transmission or non-line of sight transmission.

In a fifteenth aspect, provided is a communication device. The communication device includes: a detecting unit configured for detecting a first path loss of a first carrier and a second path loss of a second carrier on the basis of a set signal; and a transmitting unit configured for transmitting detection results to a transmitting device of the set signal, wherein the detection results are used by the transmitting device to determine a type of a wireless channel; where the type of the wireless channel includes line of sight transmission or non-line of sight transmission, and the detection results include the first path loss and the second path loss, and/or a difference between the first path loss and the second path loss.

In a sixteenth aspect, provided is a communication device. The communication device includes: a receiving unit configured for receiving detection results, the detection results including a first path loss, detected on the basis of a set signal, of a first carrier and a second path loss, detected on the basis of the set signal, of a second carrier, and/or a difference between the first path loss and the second path loss; and a processing unit configured for determining a type of a wireless channel according to the detection results, the type of the wireless channel including line of sight transmission or non-line of sight transmission.

In a seventeenth aspect, provided is a communication device. The communication device includes: a first determining unit configured for determining a type of a wireless channel through at least two of a first detection method, a second detection method, or a third detection method, the type of the wireless channel including line of sight transmission or non-line of sight transmission; and a second determining unit configured for determining the type of the wireless channel as line of sight transmission in response to determining that the type of the wireless channel determined through at least two of the first detection method, the second detection method, or the third detection method is line of sight transmission, or, determining the type of the wireless channel as non-line of sight transmission in response to determining that the type of the wireless channel determined through at least two of the first detection method, the second detection method, or the third detection method is non-line of sight transmission; where the first detection method includes: detecting frequency domain channel responses of different sub-carriers of the same carrier or different carriers on the basis of a set signal; determining phases of correlation values, on the different sub-carriers of the same carrier or phases of correlation values, on the different carriers, of the frequency domain channel responses; and determining the type of the wireless channel according to slope consistency characteristics of the phases of the correlation values on the different sub-carriers of the same carrier or on the different carriers; the second detection method includes: detecting frequency domain channel responses, at different times, on a first signal carrier and frequency domain channel responses, at different times, on a second signal carrier on the basis of a set signal, the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna; determining phases, at different times, on the first signal carrier and phases, at different times, on the second signal carrier according to the frequency domain channel responses; determining a first phase difference between the phases, at different times, on the first signal carrier according to the phases, at different times, on the first signal carrier, and determining a second phase difference between the phases, at different times, on the second signal carrier according to the phases, at different times, on the second signal carrier; and determining the type of the wireless channel according to a ratio of the first phase difference to the second phase difference; and the third detection method includes: detecting a first path loss of a first carrier and a second path loss of a second carrier on the basis of a set signal; and determining the type of the wireless channel according to a difference between the first path loss and the second path loss.

In an eighteenth aspect, provided is a communication device. The communication device includes a processor, a memory, and a transceiver, wherein the transceiver is configured for receiving and transmitting data under the control of the processor, the memory is configured for storing a computer instruction, and the processor is configured for reading the computer instruction, so as to execute the method in any one of the first aspect to the seventh aspect.

In a nineteenth aspect, provided is a computer-readable storage medium, storing a computer-executable instruction, the computer-executable instruction being configured for causing the computer to execute the method in any one of the first aspect to the seventh aspect.

In the embodiments described above of the present disclosure, the type of the channel may be identified on the basis of at least one of the carrier phase slope consistency, the ratio of the phase differences, at different times, of the carrier phase, or the carrier path loss, that is, the type of the channel is determined as the LOS transmission or the NLOS transmission, thereby effectively improving the precision of positioning solution.

BRIEF DESCRIPTION OF THE DRAWINGS

In order to describe the technical solutions in the embodiments of the present disclosure more clearly, the accompanying drawings required for describing the embodiments of the present disclosure are briefly described below. Obviously, the accompanying drawings in the following description show merely some embodiments of the present disclosure, and a person of ordinary skill in the art can also derive other accompanying drawings from these accompanying drawings without creative efforts.

DETAILED DESCRIPTION OF THE EMBODIMENTS

First, a multi-path channel model and a channel frequency response related to the present disclosure will be described below.

1. Multi-Path Channel Model

It is assumed that at time t, an impulse response of a multi-path channel between a transmitter and a receiver is modeled through the following formula:

$$h(\tau,t)=\sum_{l=0}^{L-1}h_l(t)e^{-j\phi_l(t)}\delta(\tau-\tau_l) \quad (1).$$

Where $h_l(t)$ is relative attenuation of an $l^{th}$ path, $\phi_l(t)$ is phase offset of the $l^{th}$ path, and $\tau_l$ is a propagation delay of the $l^{th}$ path. The number of multi-path components is L, and $\delta(\cdot)$ denotes a Dirac delta function. The phase offset $\phi_l(t)$ includes a component $2\pi f_c \tau_l$ caused by free space propagation and a component $\phi_l^*(t)$ caused by other phase noises experienced in the channel, and $\phi_l^*(t)$ is possibly caused by an initial phase noise. $\phi_l(t)$ may be expressed by the following formula:

$$\phi_l(t)=2\pi f_c \tau_l+\phi_l^*(t) \quad (2).$$

Where $f_c$ denotes a center frequency of a carrier.

If it is assumed that the channel is a quasi-static channel, that is, the channel remains unchanged during transmission of one orthogonal frequency division multiplex (OFDM) symbol, the quasi-static channel may be described by a time-discrete channel impulse response (CIR) $h=[h_0, h_1, \ldots, h_{L-1}]^T$:

$$h(t)=\sum_{l=0}^{L-1}h_l e^{-j\phi_l}\delta(t-\tau_l)=\sum_{l=0}^{L-1}\tilde{h}_l \delta(t-\tau_l); \tilde{h}_l=h_l e^{-j\phi_l} \quad (3).$$

Where $h_l$ is attenuation of the $l^{th}$ path, $\phi_l$ is phase shift of the $l^{th}$ path, and $\tau_l$ is an attenuated propagation delay component of the $l^{th}$ path. The delay component $\tau_l$ is in seconds. When sampling is performed with a sampling interval, the delay component takes the number of samples as the unit, and is set as $\tau_l^* = \tau_l/T_s$, $T_s = 1/(N\Delta f_{SCS})$ denoting the sampling time interval, $\Delta f_{SCS}$ denoting a sub-carrier interval, and N denoting the number of points of fast Fourier transform (FFT).

For a technical solution of the carrier phase, a critical metric value that is expected to be acquired is a line of sight (LOS) component $2\pi f_c \tau_0$ caused by free space propagation included in the phase offset $\phi_l(t)$.

2. Channel Frequency Response of Multi-Path Channel

First, timing offset $\Delta t$, frequency offset $\Delta f$, and a phase noise are defined below.

Figure 1:
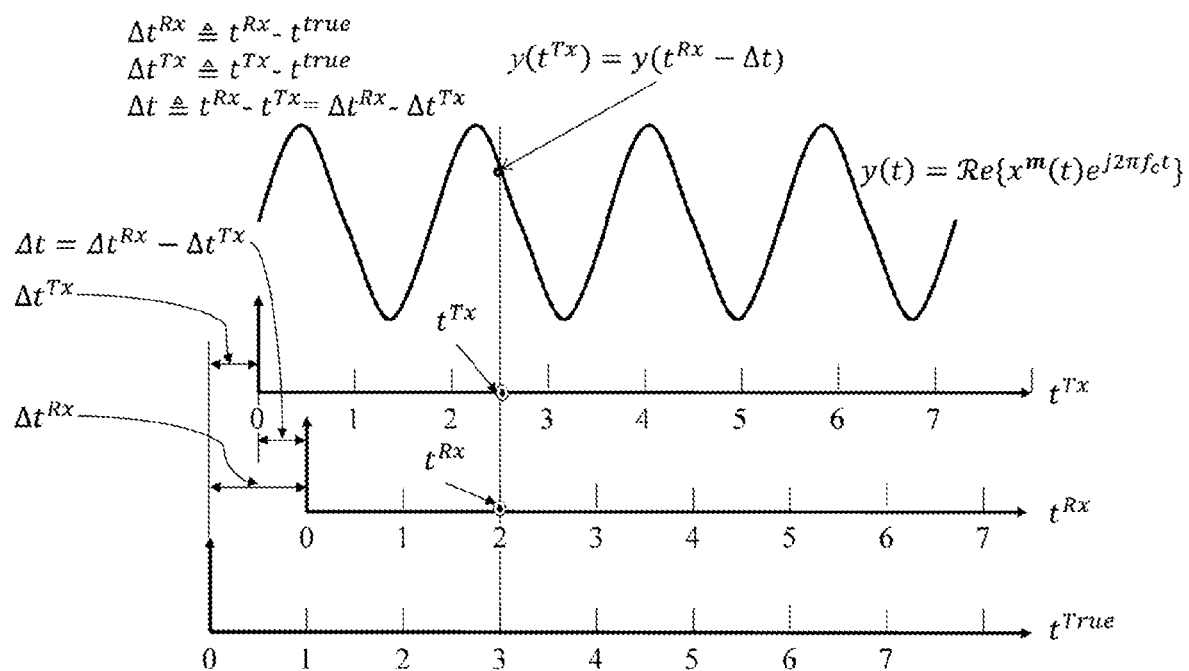
FIG. 1 is a schematic diagram of timing offset in an embodiment of the present disclosure.

As shown in FIG. 1, it is defined that $\Delta t^{Rx} \triangleq t^{Rx} - t^{true}$ denotes timing offset between an actual timing and an ideal timing of the receiving end, $\Delta t^{Tx} \triangleq t^{Tx} - t^{true}$ denotes timing offset between an actual timing and an ideal timing of a transmitting end, and $\Delta t \triangleq t^{Rx} - t^{Tx} = \Delta t^{Rx} - \Delta t^{Tx}$ denotes timing offset between the transmitting end and the receiving end, so that a received signal received at a time $t^{Rx}$ of the receiving end corresponds to a time $t^{Tx} = t^{Rx} - \Delta t$ of the transmitting end.

It is assumed that carrier frequency offset (CFO) after initial time synchronization and frequency synchronization between the receiving end and the transmitting end is $\Delta f$, and $\delta f = \Delta f / \Delta f_{SCS}$ denotes normalized frequency offset, $\Delta f_{SCS}$ being a sub-carrier interval.

It is assumed that $\phi_{TX}(t)$ is a phase noise of an oscillator of the transmitter, and $\phi_{RX}(t)$ is a phase noise of an oscillator of the receiver. $x^m(t)e^{j\phi_{Tx}(t)}$ may denote an influence, on an up-conversion of the transmitted signal $x^m(t)$, from $\phi_{TX}(t)$, and $y^m(t)e^{j\phi_{Rx}(t)}$ may denote an influence, on a down-conversion of the received signal $y^m(t)$, from $\phi_{RX}(t)$. In an OFDM system model, a frequency domain channel bandwidth corresponding to each sub-carrier may be generally deemed as a frequency flat fading channel. The phase noises of the transmitter and the receiver have the same influence on the OFDM system model under the frequency flat fading channel. Thus, in the OFDM system model, the phase noise of the oscillator of the receiver may be used to denote the combined influence, on the OFDM system model, from the phase noises of the transmitter and the receiver.

On the basis of the definitions described above, through mathematical derivation, it may be found that an expression of a frequency domain received symbol $R_k^m$, on a kth sub-carrier, of an mth OFDM symbol of the OFDM system upon the concurrence of the influence from the timing offset $\Delta t$, the frequency offset $\Delta f$, and the phase noise is as follows:

$$R_k^m = \underbrace{e^{1i\theta^{m,1}} e^{-1i2\pi(f_c + k\Delta f_{SCS})\Delta t}}_{\substack{\delta f \quad \Delta t \\ CPE}} J_0 H_k X_k + ICI_k^m + W_k. \quad (4)$$

Where $J_0 = \sqrt{N} e^{1i(\phi_n^m + \theta_n^{m,2})}$, $H_k$ denotes type 1 of an equivalent frequency domain channel response on the kth sub-carrier (only considering an ideal transmission delay), $X_k$ denotes a modulation symbol transmitted on the kth sub-carrier, $ICI_k^m$ denotes an inter sub-carrier interference, on the kth sub-carrier, of the mth OFDM symbol, and $W_k \sim \mathcal{CN}(0, \sigma^2)$ follows a complex Gaussian distribution with a mean value of 0 and a variance of $\sigma^2$.

$$ICI_k^m = e^{1i\theta^{m,1}} e^{-1i2\pi(f_c + k\Delta f_{SCS})\Delta t} \sum_{r=0; r \neq k}^{N-1} J_{k-r} H_r X_r \quad (k = 0, 1, \ldots, N-1) \quad (5)$$

$$H_k = \sum_{l=0}^{L-1} h_l e^{-1i2\pi(f_c + k\Delta f_{SCS})\tau_l} e^{-1i2\pi\phi_l^*} \quad (k = 0, 1, \ldots, N-1)$$

$l$ denotes the $l^{th}$ path. $\quad (6)$ $$J_p = \frac{1}{\sqrt{N}} \sum_{n=0}^{N-1} e^{1i(\phi_n^m + \theta_n^{m,2})} e^{-2\pi n p / N} \quad (p = 0, 1, \ldots, N-1)$$

$$\theta^{m,1} = 0; \theta_n^{m,2} = 2\pi n \delta f / N \quad (7)$$

It may be seen from formula (4) that for a single-path LOS channel, without regard to the timing offset and inter code interference (ICI) introduced by the phase noise and the frequency offset, type 1 $H_k$ of an equivalent frequency domain channel response on the kth sub-carrier (only considering the ideal transmission delay) is:

$$H_k = e^{-1i2\pi(f_c + k\Delta f_{SCS})\tau_0} e^{-1i2\pi\phi_0*} \quad (8).$$

Where $\phi_0^*$ denotes is a component caused by other phase noises experienced in the single-path LOS channel, and 1i denotes an imaginary unit (that is, 1i=sqrt(−1)).

In order to make the objectives, technical solutions, and advantages of the present disclosure clearer, the present disclosure will be further described in detail below in conjunction with the accompanying drawings. Obviously, the described embodiments are merely some embodiments rather than all embodiments of the present disclosure. On the basis of the embodiments of the present disclosure, all other embodiments obtained by those of ordinary skill in the art without creative efforts fall within the scope of protection of the present disclosure.

For ease of understanding by those skilled in the art, some terms in the embodiments of the present disclosure are explained below.

(1) In the embodiments of the present disclosure, the terms "network" and "system" are frequently used interchangeably, but those skilled in the art can understand their meanings.

(2) In the embodiments of the present disclosure, the term "multiple" refers to two or more, and other quantifiers are analogous thereto.

(3) "and/or", describing an association relation of associated objects, indicates that there may be three relations, for example, A and/or B may indicate three situations: A alone, both A and B, and B alone. The character "/" generally indicates that the successive association objects are in an "or" relation.

(4) Network devices are devices that provide a radio communication function for a terminal, and include, but are not limited to, a next generation node B (gNB) in the 5th generation mobile communication (5G), a radio network controller (RNC), a node B (NB), a base station controller (BSC), a base transceiver station (BTS), a home base station (for example, a home evolved node B or a home node B (HNB)), a baseband Unit (BBU), a transmitting and receiving point (TRP), a transmitting point (TP), a mobile switching center, etc. The base station in the present disclosure can also be a device that may appear in the future, so as to provide a radio communication function for a terminal in other communication systems. In the embodiments of the present disclosure, the "base station" is described as an example.

(5) A terminal is a device that can provide voice and/or data connectivity for a user. For example, terminal devices include a handheld device, an in-vehicle device, etc. having a radio connection function. Currently, the terminal device can be: a mobile phone, a tablet computer, a notebook computer, a palmtop computer, a mobile internet device (MID), a wearable device, a virtual reality (VR) device, an augmented reality (AR) device, a radio terminal in industrial control, a radio terminal in self-driving, a radio terminal in smart grid, a radio terminal in transportation safety, a radio terminal in smart city or a radio terminal in smart home, etc.

The embodiments of the present disclosure provide a method for detecting a type of a wireless channel and an apparatus therefor, employing an LOS channel and an NLOS channel identifiable in the embodiments of the present disclosure. In the embodiments of the present disclosure, a receiving device may determine whether a current wireless channel is the LOS channel or the NLOS channel (that is, determine whether the type of the current wireless channel is LOS transmission or NLOS transmission) on the basis of at least one of the following methods. Method 1: determination is performed on the basis of a carrier phase slope consistency; Method 2: determination is performed on the basis of a ratio of phase differences, at different times, of a carrier phase; or Method 3: determination is performed on the basis of a carrier path loss.

In the embodiments of the present disclosure, a downlink signal may be used to identify the LOS channel and the NLOS channel, which is suitable for a terminal-assisted downlink positioning solution. In this case, a terminal serves as a receiving device, and a set signal is utilized to identify the LOS channel and the NLOS channel. In the embodiments of the present disclosure, an uplink signal may be used to identify the LOS channel and the NLOS channel, which is suitable for an uplink positioning solution. In this case, a base station serves as a receiving device, and a set signal is utilized to identify the LOS channel and the NLOS channel.

The set signal may be a positioning reference signal (PRS), etc., which is not limited in the embodiments of the present disclosure.

The methods 1, 2, and 3 described above according to the embodiments of the present disclosure and their combinations will be described in detail below in combination with the accompanying drawings.

Figure 2:
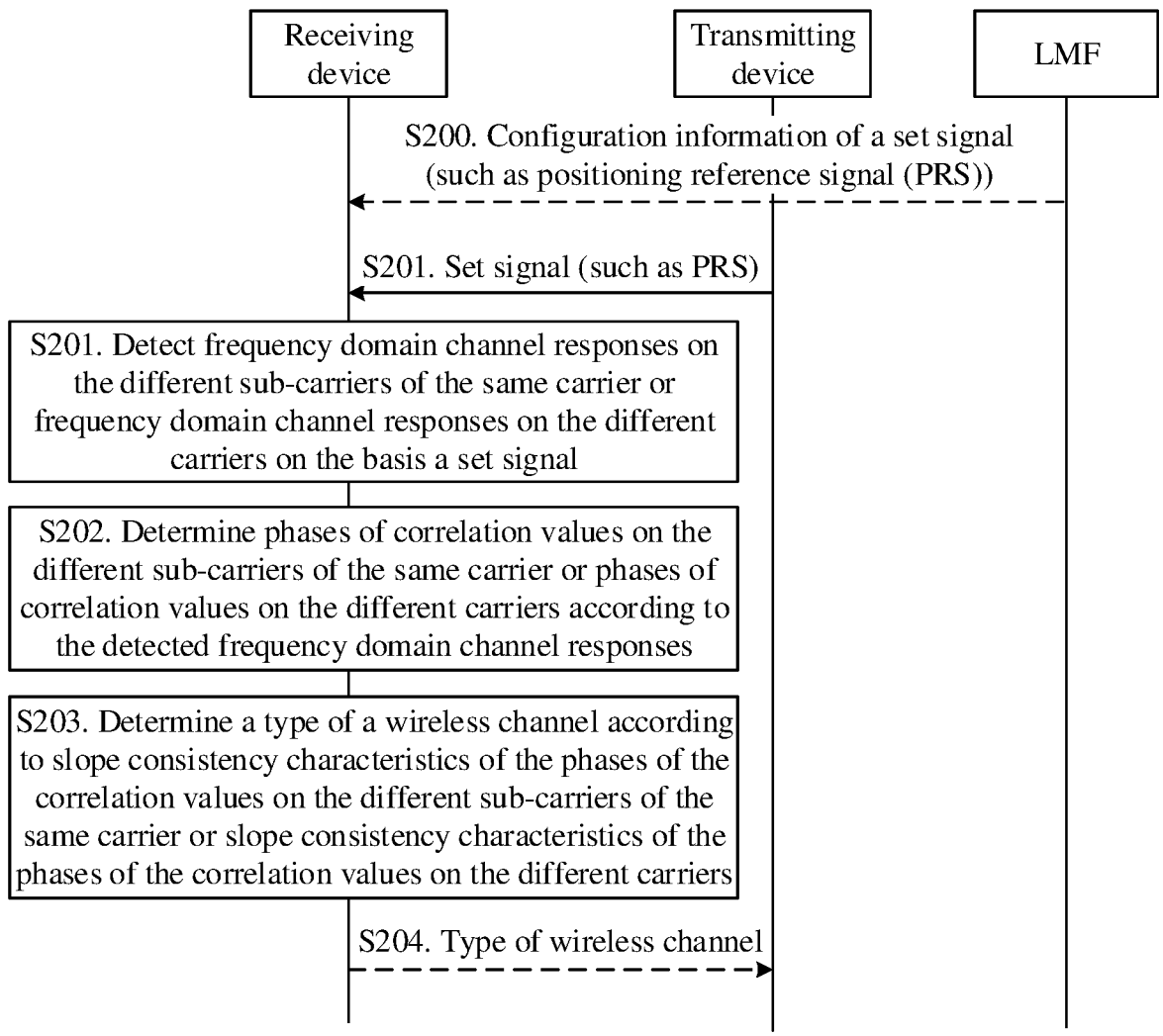
FIGS. 2-5 each are a schematic flowchart of a method for detecting a type of a wireless channel on the basis of a carrier phase slope consistency according to an embodiment of the present disclosure.

With reference to FIG. 2, a schematic flowchart of a method for detecting a type a wireless channel on the basis of a carrier phase slope consistency according to an embodiment of the present disclosure.

If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The flow is executed by the receiving device. Specifically, the flow may be executed by a receiver in the receiving device.

As shown in FIG. 2, the flow may include the following steps.

S201: the receiving device detects frequency domain channel responses on the different sub-carriers of the same carrier or frequency domain channel responses on the different carriers on the basis of a set signal.

The set signal may be the PRS.

In some embodiments, with the PRS as an example, the receiving device may detect the frequency domain channel responses on the different sub-carriers of the same carrier on the basis of the PRS. Specifically, the receiving device may detect frequency domain channel responses on a first sub-carrier, a second sub-carrier, a third sub-carrier, and a fourth sub-carrier, respectively, on the basis of the PRS, the first sub-carrier, the second sub-carrier, the third sub-carrier, and the fourth sub-carrier being on the same carrier.

In some other embodiments, with the PRS as an example, the receiving device may detect the frequency domain channel responses on the different carriers on the basis of the PRS. Specifically, the receiving device may detect frequency domain channel responses on a first sub-carrier, a second sub-carrier, a third sub-carrier, and a fourth sub-carrier, respectively, on the basis of the PRS, the first sub-carrier and the second sub-carrier being on a first carrier, and the third sub-carrier and the fourth sub-carrier being on a second carrier.

In yet other embodiments, with the PRS as an example, the receiving device may detect the frequency domain channel responses on the different receiving antennas on the basis of the PRS. Specifically, the receiving device may detect frequency domain channel responses on a first sub-carrier, a second sub-carrier, a third sub-carrier, and a fourth sub-carrier, respectively, on the basis of the PRS, the first sub-carrier and the second sub-carrier being on a first carrier, the third sub-carrier and the fourth sub-carrier being on a second carrier, the first carrier being received by a first antenna, and the second carrier being received by a second antenna.

Optionally, the embodiments of the present disclosure do not require intervals of the first sub-carrier, the second sub-carrier, the third sub-carrier, and the fourth sub-carrier. Certainly, the receiving device may also detect the frequency domain channel responses on a larger number of sub-carriers.

S202: the receiving device determines phases of correlation values on the different sub-carriers of the same carrier or phases of correlation values on the different carriers according to the detected frequency domain channel responses.

Specifically, if in S201, the receiving device detects the frequency domain channel responses on the different sub-carriers of the same carrier on the basis of the set signal, in S202, the receiving device determines the phases of the correlation values on the different sub-carriers of the same carrier according to the frequency domain channel responses. If in S201, the receiving device detects the frequency domain channel responses on the different carriers on the basis of the set signal, in S202, the receiving device determines the phases of the correlation values on the different carrier waves according to the frequency domain channel responses.

For example, the correlation values on the different sub-carriers may include $(H1_{k_2}*H1_{k_1}*)$ and $(H1_{k_4}*H1_{k_3}*)$, where $H1_{k_1}$ denotes a frequency domain channel response detected on the first sub-carrier, $H1_{k_2}$ denotes a frequency domain channel response detected on the second sub-carrier, $H1_{k_3}$ denotes a frequency domain channel response detected on the third sub-carrier, $H1_{k_4}$ denotes a frequency domain channel response detected on the fourth sub-carrier, and P* denotes a conjugate of a variable P.

In the step, the receiving device calculates $(H1_{k_2}*H1_{k_1}*)$ according to the frequency domain channel responses of the first sub-carrier and the second sub-carrier, and further calculates phase$(H1_{k_2}*H1_{k_1}*)$ of the phases of the correlation value. The receiving device calculates $(H1_{k_4}*H1_{k_3}*)$ according to the frequency domain channel responses of the third sub-carrier and the fourth sub-carrier, and further calculates phase($H1_{k_4}*H1_{k_3}*$) of the phases of the correlation value. phase( ) is a function configured for calculating a phase.

Certainly, the receiving device may also determine the phases of the correlation values on the different sub-carriers of the same carrier or the phases of the correlation values on the different carriers according to the frequency domain channel responses detected on a larger number of sub-carriers on the basis of the set signal. For example, phases of correlation values on at least the first sub-carrier and the second sub-carrier are determined according to the frequency domain channel responses detected on at least the first sub-carrier and the second sub-carrier on the basis of the set signal, and phases of correlation values on at least the third sub-carrier and the fourth sub-carrier are determined according to the frequency domain channel responses detected on at least the third sub-carrier and the fourth sub-carrier on the basis of the set signal.

S203: the receiving device determines the type of the wireless channel according to slope consistency characteristics of the phases of the correlation values on the different sub-carriers of the same carrier or slope consistency characteristics of the phases of the correlation values on the different carriers, the type of the wireless channel including one of LOS transmission and NLOS transmission.

The slope consistency characteristics refer to whether a slope, relative to an interval between the first sub-carrier and the second sub-carrier, of phase($H1_{k_2}*H1_{k_1}*$) is consistent with a slope, relative to an interval between the third sub-carrier and the fourth sub-carrier, of phase($H1_{k_4}*H1_{k_3}*$). If slopes of the phases of the correlation values described above have the consistency, it indicates that the type of the wireless channel is the LOS transmission, otherwise it indicates that the type of the wireless channel is NLOS transmission.

In the embodiments of the present disclosure, a first-order derivative or a second-order derivative, relative to an interval between corresponding sub-carriers, of the phase of the correlation value may be used to measure the phase slope consistency. Determinations of the phase slope consistency performed on the basis of the first-order derivative and the second-order derivative are described below.

1: Determination of Phase Slope Consistency Performed on the Basis of First Oorder Derivative For the LOS channel, the first-order derivatives, relative to an interval between different sub-carriers, of the phases of different sub-carriers are fixed. In the embodiments of the present disclosure, on the basis of the feature, whether the wireless channel is the LOS channel is determined according to whether the first derivatives, relative to the interval between different sub-carriers, of the phases of different sub-carriers are the same or substantially the same. A specific method is described as follows.

The receiving device determines a first first-order derivative, relative to the interval between the first sub-carrier and the second sub-carrier, of the phases of the correlation values on the first sub-carrier and the second sub-carrier on the basis of the phases of the correlation values on the first sub-carrier and the second sub-carrier and the interval between the first sub-carrier and the second sub-carrier. A calculation formula of the first first-order derivative is as follows:

$$\text{Derivative\_first\_order\_1} = \text{phase}(H1_{k_2}*H1_{k_1}*)/(-2\pi(k_2-k_1)\cdot \Delta f_{scs}) \quad (9)$$

Derivative_first_order_1 denotes the first first-order derivative, phase($H1_{k_2}*H1_{k_1}*$) denotes the phases of the correlation values on the first sub-carrier and the second sub-carrier, $k_1$ denotes an index of the first sub-carrier, $k_2$ denotes an index of the second sub-carrier, and $\Delta f_{scs}$ denotes a sub-carrier interval. Since the indexes of the sub-carriers are generally arranged in the ascending order or descending order of frequencies, $-2\pi(k_2-k_1)\cdot \Delta f_{scs}$ may denote the interval between the first sub-carrier and the second sub-carrier.

The receiving device determines a second first-order derivative, relative to the interval between the third sub-carrier and the fourth sub-carrier, of the phases of the correlation values on the third sub-carrier and the fourth sub-carrier on the basis of the phases of the correlation values on the third sub-carrier and the fourth sub-carrier and the interval between the third sub-carrier and the fourth sub-carrier. A calculation formula of the second first-order derivative is as follows:

$$\text{Derivative\_first\_order\_2} = \text{phase}(H1_{k_4}*H1_{k_3}*)/(-2\pi(k_4-k_3)\cdot \Delta f_{scs}) \quad (10)$$

Derivative_first_order_2 denotes the second first-order derivative, phase($H1_{k_4}*H1_{k_3}*$) denotes the phases of the correlation values on the third sub-carrier and the fourth sub-carrier, $k_3$ denotes an index of the third sub-carrier, and $k_4$ denotes an index of the fourth sub-carrier. Since the indexes of the sub-carriers are generally arranged in the ascending order or descending order of frequencies, $-2\pi((k_4-k_3)\cdot \Delta f_{scs}$ may denote the interval between the third sub-carrier and the fourth sub-carrier.

It is to be noted that the above formula is based on the assumption $(k_2-k_1)\cdot \Delta f_{scs}\cdot \tau_0<1$, and $(k_4-k_3)\cdot \Delta f_{scs}\cdot \tau_0<1$. In this case, a complete transmission delay $\tau_0$ may be obtained, otherwise the complete transmission delay $\tau_0$ is unobtainable.

The receiving device may characterize the slope consistency characteristics of the phases through a relative difference between the first first-order derivative Derivative_first_order_1 and the second first-order derivative Derivative_first_order_2, and determine the type of wireless channel on the basis of the slope consistency characteristics of the phases.

Specifically, the receiving device calculates the relative difference according to the first first-order derivative Derivative_first_order_1 and the second first-order derivative Derivative_first_order_2, a calculation formula of which may be as follows:

$$M\_rel = \text{abs}(\text{Derivative\_first\_order\_2} - \text{Derivative\_first\_order\_1})/(\text{Derivative\_first\_order\_1}) \quad (11)$$

M_rel denotes the relative difference between the first first-order derivative Derivative_first_order_1 and the second first-order derivative Derivative_first_order_2, and abs( ) denotes an absolute value operation. Certainly, the denominator in formula (11) described above may also be replaced with Derivative_first_order_2.

If the relative difference M_rel is less than a set threshold $\eta_{th}$, it is deemed that the slopes of the phases of the correlation values on the different sub-carriers of the same carrier have the consistency, or the slopes of the phases of the correlation values on the different carriers have the consistency, so that the type of the wireless channel type is determined as the LOS transmission; otherwise the slopes of the phases of the correlation values on the different sub-carriers of the same carrier do not have the consistency, or the slopes of the phases of the correlation values on the different carriers do not have the consistency, so that the type of the wireless channel is determined as the NLOS transmission. The threshold $\eta_{th}$ is an integer greater than or equal to zero.

Determination conditions may be expressed as:

$$\begin{cases} M_{rel} < \eta_{th}, & \text{consistent slopes of the phases} \\ M_{rel} \geq \eta_{th}, & \text{inconsistent slopes of the phases} \end{cases} \quad (12)$$

It is to be noted that in the embodiments of the present disclosure, other methods may also be used to determine whether the slopes of the phases of the correlation values have the consistency according to the first first-order derivative Derivative_first_order_1 and the second first-order derivative Derivative_first_order_2 described above. For example, it may be whether values of the first first-order derivative Derivative_first_order_1 and the second first-order derivative Derivative_first_order_2 are equal. If they are equal to each other, it indicates that the slopes of the phases of the correlation values have the consistency, otherwise it indicates that the slopes of the phases of the correlation values do not have the consistency.

2: Determination of Phase Slope Consistency Performed on the Basis of Second-Order Derivative For the LOS channel, the second-order derivatives, relative to an interval between different sub-carriers, of the phases of different sub-carriers are zero, or an absolute value of the second-order derivative is less than a fixed value. In the embodiments of the present disclosure, on the basis of the feature, whether the wireless channel is the LOS channel is determined according to the second-order derivatives, relative to the interval between different sub-carriers, of the phases of different sub-carriers. A specific method is described as follows.

After calculating the first first-order derivative Derivative_first_order_1 and the second first-order derivative Derivative_first_order_2 described above, the receiving device further calculates the second-order derivative according to the first first-order derivative Derivative_first_order_1 and the second first-order derivative Derivative_first_order_2, a calculation formula of which may be as follows:

Derivative_second_order_1=abs(Derivative_first_order_2−Derivative_first_order_1)/(($k_4$−$k_3$)−

($k_2$−$k_1$))=($\widehat{\tau_{k2,k1}}$−$\widehat{\tau_{k2,k1}}$)/(($k_4$−$k_3$)−($k_2$−$k_1$))  (13).

Derivative_second_order_1 denotes the second-order derivative, and the description of other parameters is the same as that of the foregoing embodiment.

The value of the second-order derivative described above may characteristic whether slopes of the phases of the correlation values on the different sub-carriers of the same carrier or slopes of the phases of the correlation values on the different carriers have the consistency. For an equivalent two-path LOS channel (one path of LOS channel+one path of NLOS channel), Derivative_second_order_1 is generally not zero. on the basis of the assumption, in the embodiments of the present disclosure, if the second-order derivative Derivative_second_order_1 described above is less than the set threshold $\eta_{th\_second}$, it is determined that the slopes of the phases of the correlation values on the different sub-carriers of the same carrier have the consistency, or the slopes of the phases of the correlation values on the different carriers have the consistency, so that the type of the wireless channel is determined as the LOS transmission, otherwise the type of the wireless channel type is determined as the NLOS transmission. The threshold $\eta_{th\_second}$ is an integer greater than or equal to zero.

Further, with the flow applied to downlink positioning as an example, in some embodiments, after S203, the method may further include: S204: the receiving device (such as the terminal) notifies the transmitting device (such as the base station) of the determined type of the wireless channel.

In the step, the receiving device may transmit indication information of the type of the wireless channel to the transmitting device, the indication information being configured for indicating whether the type of the wireless channel is the LOS transmission or the NLOS transmission.

Further, with the flow applied to downlink positioning as an example, in some embodiments, before S201, the method may further include: S200: the receiving device (such as the terminal) receives configuration information of the set signal (such as the PRS) transmitted by a location management function (LMF) entity, so that the receiving device receives the PRS transmitted by the transmitting device according to the configuration information, and identifies the type of the wireless channel on the basis of the PRS.

By employing the above flow, the LOS channel and/or the NLOS channel may be identified on the basis of the carrier phase slope consistency, thereby effectively improving the precision of positioning solution. Further, in the flow described above, the carrier phase slope consistency is determined on the basis of the detected frequency domain channel responses, so that a success rate of identifying the LOS channel and the NLOS channel may be ensured.

The implementation principle of the embodiments described above of the present disclosure is described below for a single-path channel, an equivalent two-path channel, and a multi-path channel according to carrier phase slope consistencies in different cases.

(1) For the Single-Path Channel

For a rational single-path LOS channel: frequency domain channel responses on sub-carriers $k_1$, $k_2$, $k_3$, and $k_4$ ($k_1$, $k_2$, $k_3$, and $k_4$ denote indexes of the first sub-carrier, the second sub-carrier, the third sub-carrier, and the fourth sub-carrier, respectively) on a first sub-carrier (CC1) are as shown in the following formula:

$H1_{k_1} = h_0 e^{-j2\pi(f_{c1}+k_1 \cdot \Delta f_{scs})\tau_0} e^{-j2\pi\phi_{0*}}$ $H1_{k_2} = h_0 e^{-j2\pi(f_{c1}+k_2 \cdot \Delta f_{scs})\tau_0} e^{-j2\pi\phi_{0*}}$ $H1_{k_3} = h_0 e^{-j2\pi(f_{c1}+k_3 \cdot \Delta f_{scs})\tau_0} e^{-j2\pi\phi_{0*}}$ $H1_{k_4} = h_0 e^{-j2\pi(f_{c1}+k_4 \cdot \Delta f_{scs})\tau_0} e^{-j2\pi\phi_{0*}}$.

$h_0$ denotes attenuation of a $0^{th}$ path.

When first-order derivatives are employed for identifying a type of a channel, the first-order derivatives, relative to indexes of the sub-carriers, of phases of different sub-carriers are calculated as shown in the following formula:

Derivative_first_order_1=phase($H1_{k_2} \ast H1_{k_1}\ast$)/(−2π($k_2$−$k_1$)·$\Delta f_{scs}$)=$\tau_0$ Derivative_first_order_2=phase($H1_{k_4} \ast H1_{k_3}\ast$)/(−2π($k_4$−$k_3$)·$\Delta f_{scs}$)=$\tau_0$.

It is to be noted that in the above formula, it is assumed that ($k_2$−$k_1$)·$\Delta f_{scs}$·$\tau_0$<1 and ($k_4$−$k_3$)·$\neq f_{scs}$·$\tau_0$<1. In this case, a complete delay $\tau_0$ may be obtained, otherwise the complete delay $\tau_0$ may not be obtained.

For the ideal single-path LOS channel, Derivative_first_order_1 and Derivative_first_order_2 are the same. On the basis of the feature, if Derivative_first_order_1 and Derivative_first_order_2 are the same, the current channel is the LOS channel, otherwise the current channel is the NLOS channel. When a relative difference M_rel is less than a set threshold $\eta_{th}$, it may be deemed that Derivative_first_order_1 and Derivative_first_order_2 may be the same.

M_rel=abs(Derivative_first_order_2−Derivative_first_order_1)/(Derivative_first_order_1)

When a second-order derivative is configured for identifying a type of a channel, the second-order derivative, relative to indexes of the sub-carriers, of the phases of different sub-carriers is calculated as shown in the following formula:

Derivative_second_order_1=abs(Derivative_first_order_2−Derivative_first_order_1)/((k_4−k_3)−(k_2−k_1)).

For the ideal single-path LOS channel, Derivative_second_order_1=zero. On the basis of the principle, if Derivative_second_order_1=zero, the current channel may be determined as the LOS channel, otherwise the current channel is determined as the NLOS channel.

(2) For the Equivalent Two-Path Channel (One Path of LOS Channel+One Path of NLOS Channel)

Frequency domain channel responses on sub-carriers $k_1$, $k_2$, $k_3$, and $k_4$ on the CC1 are as shown in the following formula:

$$H1_{k_1} = h_0 e^{-j2\pi(f_{C1}+k_1\cdot\Delta f_{SCS})\tau_0} e^{-j2\pi\phi_0^*} + h_1 e^{-j2\pi(f_{C1}+k_1\cdot\Delta f_{SCS})\tau_1} e^{-j2\pi\phi_1^*} =$$
$$h_0 e^{-j2\pi(f_{C1}+k_1\cdot\Delta f_{SCS})\tau_0} e^{-j2\pi\phi_0^*} * (1 + \rho_{k_1} e^{-j2\pi\delta_{k_1}^{21}}).$$

$$\rho_{k_1} = \frac{h_1}{h_0}$$

denotes a ratio of attenuation of a $1^{st}$ path to attenuation of a $0^{th}$ path, $$e^{-j2\pi\delta_{k_1}^{21}} = e^{-j2\pi(f_{c1}+k_1\cdot\Delta f_{SCS})*(\tau_1-\tau_0)} e^{-j2\pi(\Phi_1^*-\Phi_0^*)}.$$

$$H1_{k_2} = h_0 e^{-j2\pi(f_{C1}+k_2\cdot\Delta f_{SCS})\tau_0} e^{-j2\pi\phi_0^*} + h_1 e^{-j2\pi(f_{C1}+k_2\cdot\Delta f_{SCS})\tau_1} e^{-j2\pi\phi_1^*} =$$
$$h_0 e^{-j2\pi(f_{C1}+k_2\cdot\Delta f_{SCS})\tau_0} e^{-j2\pi\phi_0^*} * (1 + \rho_{k_2} e^{-j2\pi\delta_{k_2}^{21}}).$$

$$\rho_{k_2} = \frac{h_1}{h_0}$$

denotes a ratio of attenuation of the $1^{st}$ path to attenuation of the $0^{th}$ path, $$e^{-j2\pi\delta_{k_2}^{21}} = e^{-j2\pi(f_{C1}+k_2\cdot\Delta f_{SCS})*(\tau_1-\tau_0)} e^{-j2\pi(\phi_1^*-\phi_0^*)}.$$

$$H1_{k_3} = h_0 e^{-j2\pi(f_{C1}+k_3\cdot\Delta f_{SCS})\tau_0} e^{-j2\pi\phi_0^*} + h_1 e^{-j2\pi(f_{C1}+k_3\cdot\Delta f_{SCS})\tau_1} e^{-j2\pi\phi_1^*}$$
$$= h_0 e^{-j2\pi(f_{C1}+k_3\cdot\Delta f_{SCS})\tau_0} e^{-j2\pi\phi_0^*} * \left(1 + \rho_{k_3} e^{-j2\pi\delta_{k_3}^{21}}\right)$$

$$\rho_{k_3} = \frac{h_1}{h_0}$$

denotes a ratio of attenuation of the $1^{st}$ path to attenuation of the $0^{th}$ path, $$e^{-j2\pi\delta_{k_3}^{21}} = e^{-j2\pi(f_{c1}+k_3\cdot\Delta f_{scs})*(\tau_1-\tau_0)} e^{-j2\pi(\phi_1^*-\phi_0^*)}.$$

$$H1_{k_4} = h_0 e^{-j2\pi(f_{C1}+k_4\cdot\Delta f_{scs})\tau_0} e^{-j2\pi\phi_0^*} + h_1 e^{-j2\pi(f_{C1}+k_4\cdot\Delta f_{scs})\tau_1} e^{-j2\pi\phi_1^*} =$$
$$h_0 e^{-j2\pi(f_{c1}+k_4\cdot f_{\Delta scs})\tau_0} e^{-j2\pi\phi_0^*} * \left(1 + \rho_{k_4} e^{-j2\pi\delta_{k_4}^{21}}\right)$$

$$\rho_{k_4} = \frac{h_1}{h_0}$$

denotes a ratio of attenuation of the $1^{st}$ path to attenuation of the $0^{th}$ path, $$e^{-j2\pi\delta_{k_4}^{21}} = e^{-j2\pi(f_{c1}+k_4\cdot\Delta f_{scs})*(\tau_1-\tau_0)} e^{-j2\pi(\phi_1^*-\phi_0^*)}.$$

$$H1_{k_2} * H1_{k_1}^* = h_0 e^{-j2\pi(f_{c1}+k_2\cdot\Delta f_{scs})\tau_0} e^{-j2\pi\phi_0^*} *$$
$$\left(1 + \rho_{k_2} e^{-j2\pi\delta_{k_2}^{21}}\right) * \left[h_0 e^{-j2\pi(f_{c1}+k_1\cdot\Delta f_{scs})\tau_0} e^{-j2\pi\phi_0^*} *\right.$$
$$\left.\left(1 + \rho_{k_2} e^{-j2\pi\delta_{k_2}^{21}}\right)\right]^*$$
$$= h_0^2 e^{-j2\pi(k_2-k_1)\Delta f_{scs}\tau_0} * \left(1 + \rho_{k_1} e^{-j2\pi\delta_{k_1}^{21}}\right) *$$
$$\left(1 + \rho_{k_1} e^{j2\pi\delta_{k_2}^{21}}\right)$$
$$= h_0^2 e^{-j\theta_0} * \left(1 + \rho'_{k_2} e^{-j2\pi\delta'^{21}_{k_2,k_1}}\right)$$
$$= h_0^2 \sqrt{1 + (\rho'_{k_2})^2} e^{-j\theta_0} *$$
$$\left(\frac{1}{\sqrt{1+(\rho'_{k_2})^2}} + \frac{\rho'_{k_2} e^{-j2\pi\delta'^{21}_{k_2,k_1}}}{\sqrt{1+(\rho'_{k_2})^2}}\right)$$
$$= h_0^2 \sqrt{1 + (\rho'_{k_2})^2} e^{-j(\theta_0-\widehat{\theta_{k_2,k_1}})}$$

Where $$e^{-j\theta_0} = e^{-j2\pi(k_2-k_1)\Delta f_{scs}\tau_0},$$

$$e^{j\widehat{\theta_{k_2,k_1}}} = \frac{1}{\sqrt{1+(\rho'_{k_2})^2}} + \frac{\rho'_{k_2} e^{-j2\pi\delta'^{21}_{k_2,k_1}}}{\sqrt{1+(\rho'_{k_2})^2}},$$

and $$\rho'_{k_2} e^{-j2\pi\delta'^{21}_{k_2,k_1}} = \rho_{k_2} e^{-j2\pi\delta_{k_2}^{21}} + \rho_{k_1} e^{j2\pi\delta_{k_1}^{21}} + \rho_{k_2}\rho_{k_1} e^{-j2\pi(\delta_{k_2}^{21}-\delta_{k_1}^{21})}.$$

When a first-order derivative is employed for identifying a type of a channel, the first-order derivative, relative to indexes of the sub-carriers, of phases of different sub-carriers is calculated as shown in the following formula:

phase($H1_{k_2}*H1_{k_1}^*$)=(−2π($k_2$−$k_1$)$\Delta f_{scs}\widehat{\theta_{k_2,k_1}}$ )

Derivative_first_order_1=phase($H1_{k_2}*H1_{k_1}^*$)/(−2π
($k_2$−$k_1$)·$\Delta f_{scs}$)=$\tau_0$− $\widehat{\tau_{k_2,k_1}}$ $\widehat{\tau_{k_2,k}}\widehat{\theta_{k_2,k_1}}$ /(2π($k_4$−$k_3$)·$f_{scs}$).

In the same way, phase($H1_{k_4}*H1_{k_3}^*$)(−2π($k_4$−$k_3$)$\Delta f_{scs}\widehat{\theta_{k_4,k_3}}$ Derivative_first_order_2=phase($H1_{k_4}*H1_{k_3}^*$)/(−2π
($k_4$−$k_3$)·$\Delta f_{scs}$)=$\widehat{\tau_{k_4,k_3}}$ $\widehat{\tau_{k_4,k_3}}$ $\widehat{\theta_{k_4,k_3}}$ /(2π($k_4$−$k_3$)·$\Delta f_{scs}$).

It is to be noted that the values $\widehat{\tau_{k4,k3}}$ and $\widehat{\tau_{k2,k1}}$ in the above formula depend on the Rice factor (for example: $h_1/h_0$), a delay difference between the NLOS path and the LOS path (for example: $(\tau_1-\tau_0)$), indexes of carrier frequencies and sub-carriers (for example, $(f_{c1}+k_1 \cdot \Delta f_{scs})$, $(f_{c1}+k_2 \cdot \Delta f_{scs})$, $(f_{c1}+k_3 \cdot \Delta f_{scs})$ and $(f_{c1}+k_4 \cdot \Delta f_{scs})$).

For the equivalent two-path channel (one path of LOS channel+one path of NLOS channel), Derivative_first_order_1 and Derivative_first_order_2 are different. Therefore, on the basis of the principle, if Derivative_first_order_1 and Derivative_first_order_2 are the same, the current channel may be the LOS channel, otherwise the current channel is the NLOS channel. If a relative difference M_rel is less than a set threshold $\eta_{th}$, it may be deemed that Derivative_first_order_1 and Derivative_first_order_2 are the same.

M_rel=abs(Derivative_first_order_2−Derivative_first_order_1)/(Derivative_first_order_1)

When a second-order derivative is configured for identifying a type of a channel, the second-order derivative, relative to the indexes of the sub-carrier, of the phases of different sub-carriers is calculated as shown in the following formula:

Derivative_second_order_1=abs(Derivative_first_order_2−Derivative_first_order_1)/(($k_4-k_3$)−($k_2-k_1$))=abs($\widehat{\tau_{k2,k1}} - \widehat{\tau_{k2,k1}}$)/(($k_4-k_3$)−($k_2-k_1$)).

For the equivalent two-path LOS channel (one path of LOS channel+one path of NLOS channel), Derivative_second_order_1 is generally not zero and greater than the set threshold $\eta_{th\_second}$. Therefore, on the basis of the principle, if Derivative_second_order_1>$\eta_{th\_second}$, it may be determined that the type of the current channel is the type of the LOS channel, otherwise the type of the current channel is the type of the NLOS channel (3) For an N-Path Channel Since the ideal $\tau_0$ is unobtainable through a channel response calculation formula, metric values (a first-order derivative and a second-order derivative) calculated in this case do not have the physical meaning of the corresponding LOS path. Therefore, the first-order derivative will not be fixed, and the second-order derivative will not be zero.

Figure 3:
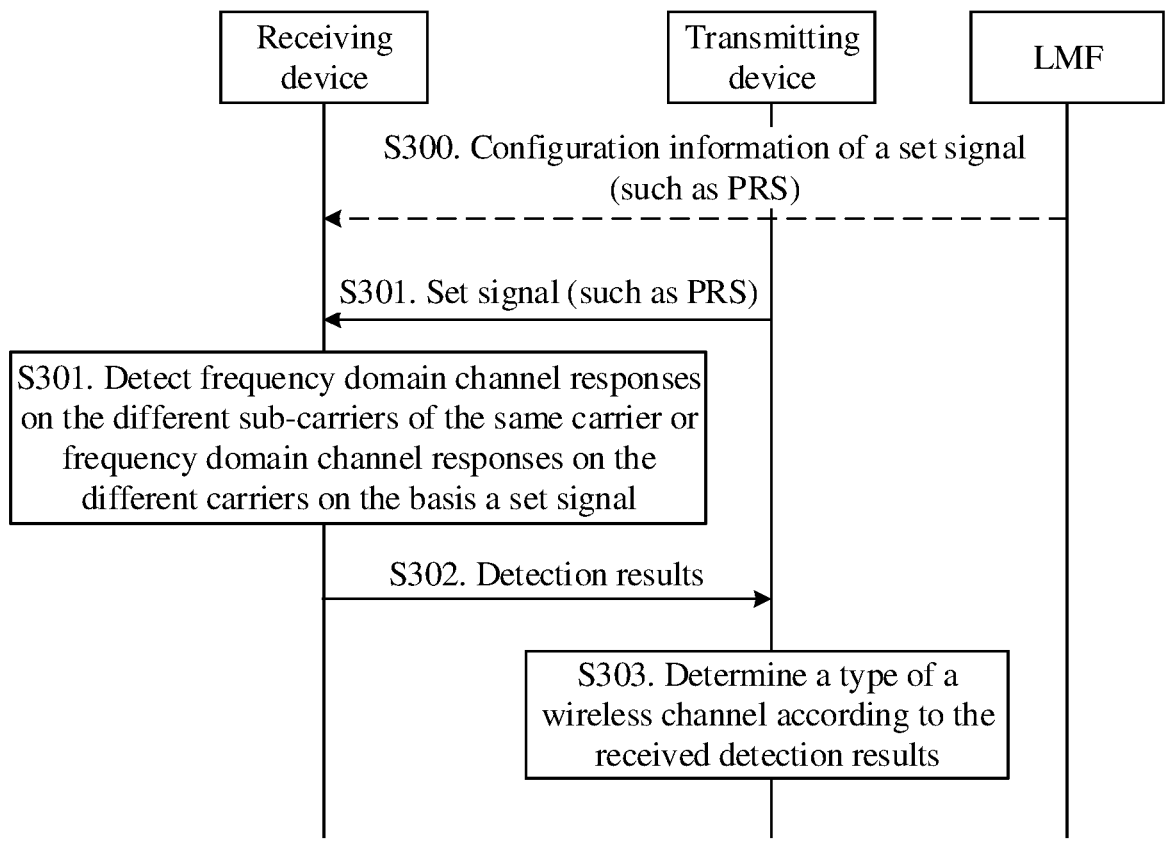

With reference to FIG. 3, a schematic flowchart of another method for detecting a type of a wireless channel on the basis of a carrier phase slope consistency according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 3, the flow may include the following steps.

S301: the receiving device detects frequency domain channel responses on the different sub-carriers of the same carrier or frequency domain channel responses on the different carriers on the basis a set signal.

Reference may be made to S201 in the flow shown in FIG. 2 for a specific implementation method of the step.

S302: the receiving device transmits detection results to the transmitting device for a set signal.

The detection results are configured for determining the type of the wireless channel, and include the frequency domain channel responses detected in S301.

The detection results may include: frequency domain channel responses, detected on the basis of the set signal, on a first sub-carrier, a second sub-carrier, a third sub-carrier, and a fourth sub-carrier, and indexes of the first sub-carrier, the second sub-carrier, the third sub-carrier, and the fourth sub-carrier.

Further, if the receiving device measures frequency domain channel responses of different sub-carriers on the different carriers (such as a first carrier and a second carrier), the detection results may further include: an index of the first carrier and an index of the second carrier. If the receiving device measures frequency domain channel responses of signals received by different receiving antennas (such as a first antenna and a second antenna), the detection results may further include: an index of the first antenna and an index of the second antenna.

S303: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 2, which will not be repeated herein.

Further, with the flow applied to downlink positioning as an example, in some embodiments, before S301, the method may further include: S300: the receiving device (such as a terminal) receives configuration information of the set signal (such as the PRS) transmitted by an LMF entity, so that the receiving device receives the PRS transmitted by the transmitting device according to the configuration information.

Figure 4:
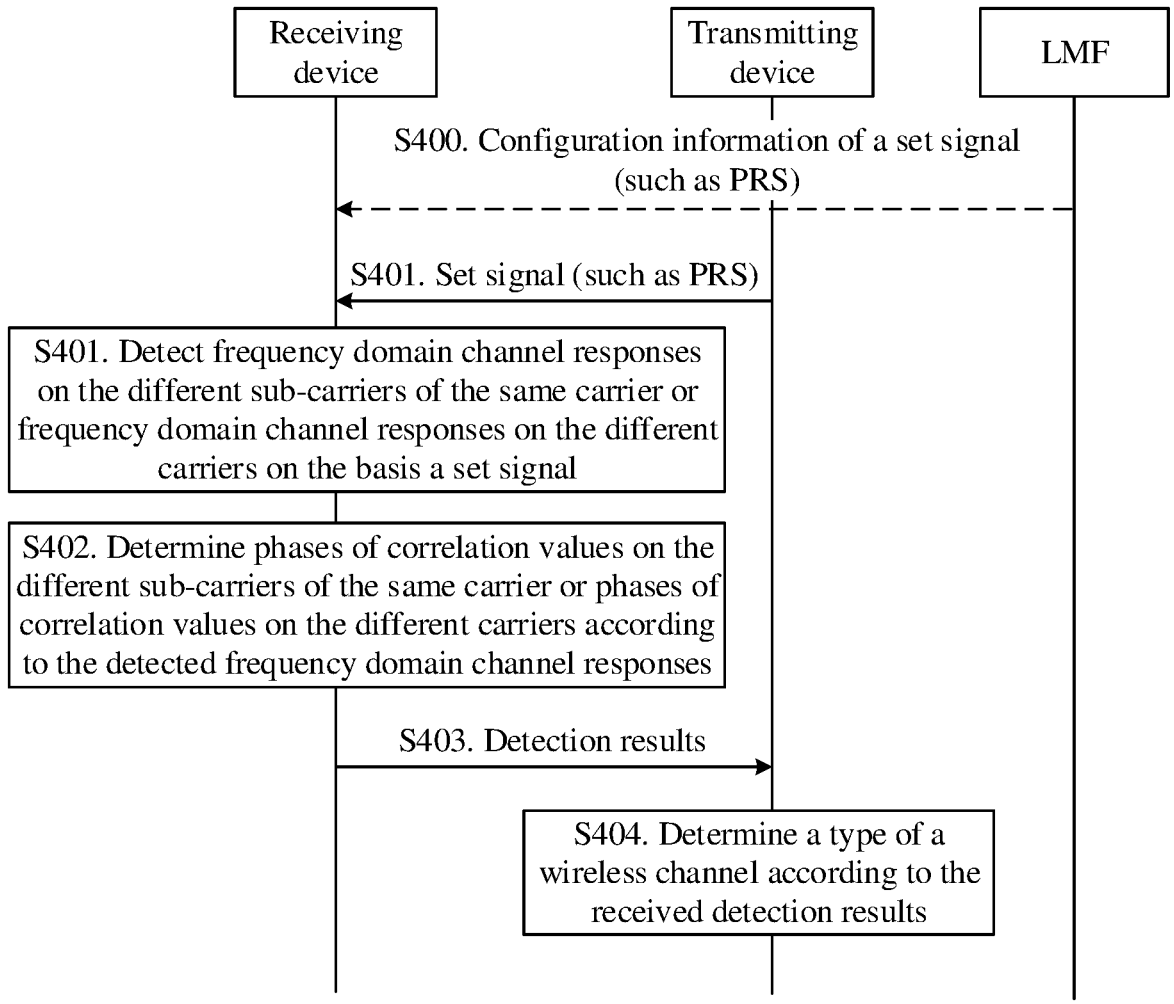

With reference to FIG. 4, a schematic flowchart of another method for detecting a type of a wireless channel on the basis of a carrier phase slope consistency according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 4, the flow may include the following steps.

S401: the receiving device detects frequency domain channel responses on the different sub-carriers of the same carrier or frequency domain channel responses on the different carriers on the basis a set signal.

Reference may be made to S201 in the flow shown in FIG. 2 for a specific implementation method of the step.

S402: the receiving device determines phases of correlation values on the different sub-carriers of the same carrier or phases of correlation values on the different carriers according to the detected frequency domain channel responses.

Reference may be made to S202 in the flow shown in FIG. 2 for a specific implementation method of the step.

S403: the receiving device transmits detection results to the transmitting device of the set signal.

The detection results are configured for determining the type of the wireless channel In some embodiments, the detection results include the phases determined in S402. Specifically, the detection results may include: phase($H1_{k_2}^* H1_{k_1}^*$) of phases of correlation values on a first sub-carrier and a second sub-carrier, phase($H1_{k_4}^* H1_{k_3}^*$) of phases of a third sub-carrier and a fourth sub-carrier, and indexes of the first sub-carrier, the second sub-carrier, the third sub-carrier, and the fourth sub-carrier.

In some other embodiments, the detection results may include the frequency domain channel responses detected in S401.

In yet other embodiments, the detection results may include the phases determined in S402 and the frequency domain channel responses detected in S401.

Further, if the receiving device measures frequency domain channel responses of different sub-carriers on the different carriers (such as a first carrier and a second carrier), the detection results may further include: an index of the first carrier and an index of the second carrier. If the receiving device measures frequency domain channel responses of signals received by different receiving antennas (such as a first antenna and a second antenna), the detection results may further include: an index of the first antenna and an index of the second antenna.

S404: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 2, which will not be repeated herein.

Further, with the flow applied to downlink positioning as an example, in some embodiments, before S401, the method may further include: S400: the receiving device (such as a terminal) receives configuration information of the set signal (such as the PRS) transmitted by an LMF entity, so that the receiving device receives the PRS transmitted by the transmitting device according to the configuration information.

Figure 5:
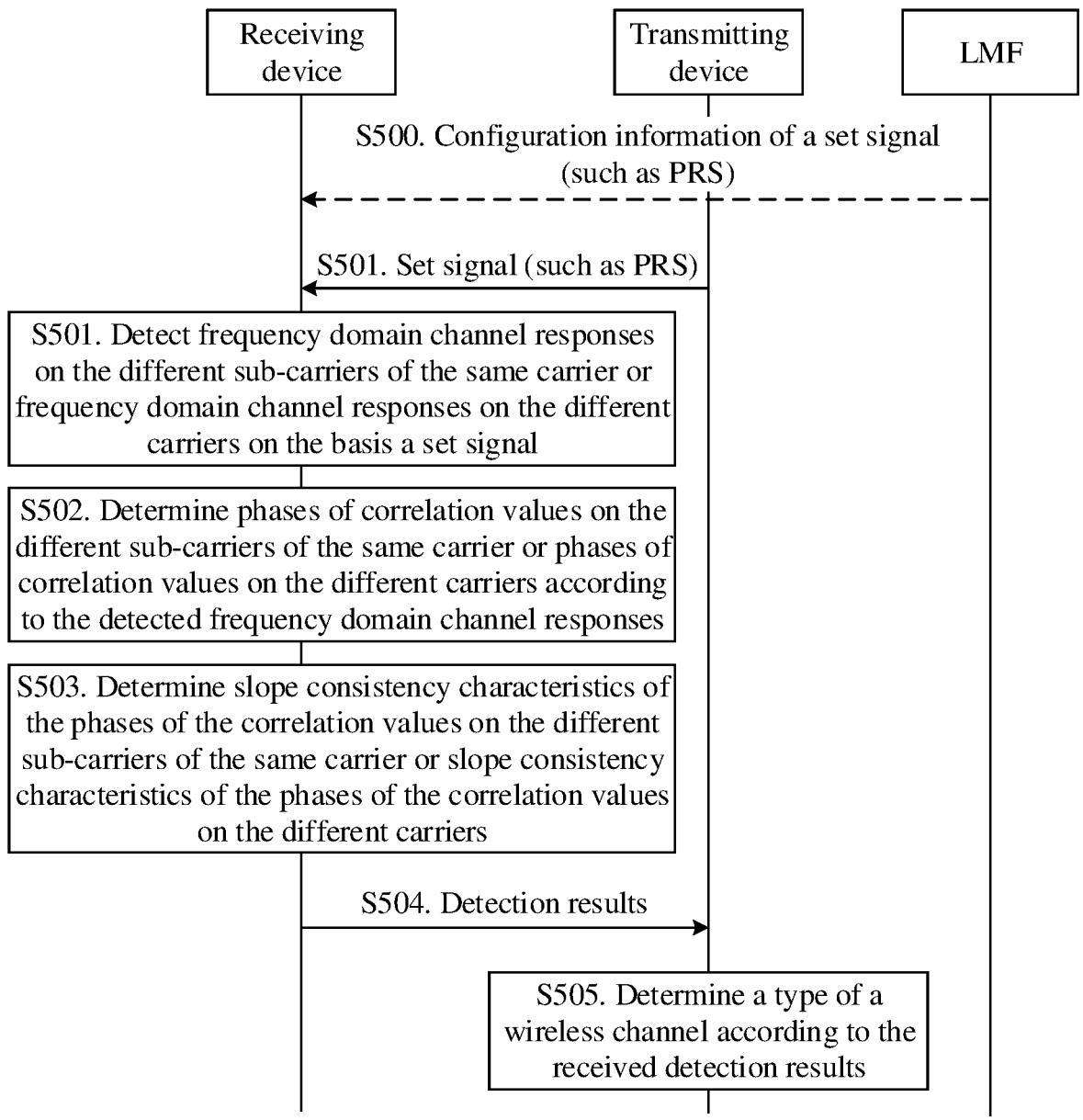

With reference to FIG. 5, a schematic flowchart of another method for detecting a type of a wireless channel on the basis of a carrier phase slope consistency according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 5, the flow may include the following steps.

S501: the receiving device detects frequency domain channel responses on the different sub-carriers of the same carrier or frequency domain channel responses on the different carriers on the basis a set signal.

Reference may be made to S201 in the flow shown in FIG. 2 for a specific implementation method of the step.

S502: the receiving device determines phases of correlation values on the different sub-carriers of the same carrier or phases of correlation values on the different carriers according to the detected frequency domain channel responses.

Reference may be made to S202 in the flow shown in FIG. 2 for a specific implementation method of the step.

S503: the receiving device determines slope consistency characteristics of the phases of the correlation values on the different sub-carriers of the same carrier or slope consistency characteristics of the phases of the correlation values on the different carriers.

In some embodiments, the slope consistency characteristics of the phases of the correlation values may include: a first first-order derivative Derivative_first_order_1 and a second first-order derivative Derivative_first_order_2. In some other embodiments, the slope consistency characteristics of the phases of the correlation values may include: a relative difference M_rel between the first first-order derivative Derivative_first_order_1 and the second first-order derivative Derivative_first_order_2. In yet other embodiments, the slope consistency characteristics of the phases of the correlation values may include: a second-order derivative Derivative_second_order_1.

Reference may be made to S203 in the flow shown in FIG. 2 for a specific implementation method of the step.

S504: the receiving device transmits detection results to the transmitting device of the set signal.

The detection results are configured for determining the type of the wireless channel.

In some embodiments, the detection results include the slope consistency characteristics, determined in S503, of the phases of the correlation values.

In some other embodiments, the detection results include the phases determined in S502. Specifically, the detection results may include: phase($H1_{k_2}^* H1_{k_1}^*$) of phases of correlation values on a first sub-carrier and a second sub-carrier, phase($H1_{k_4}^* H1_{k_3}^*$) of phases of correlation values on a third sub-carrier and a fourth sub-carrier, and indexes of the first sub-carrier, the second sub-carrier, the third sub-carrier, and the fourth sub-carrier.

In yet other embodiments, the detection results may include the frequency domain channel responses detected in S501.

Further, if the receiving device measures frequency domain channel responses of different sub-carriers on the different carriers (such as a first carrier and a second carrier), the detection results may further include: an index of the first carrier and an index of the second carrier. If the receiving device measures frequency domain channel responses of signals received by different receiving antennas (such as a first antenna and a second antenna), the detection results may further include: an index of the first antenna and an index of the second antenna.

S505: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 2, which will not be repeated herein.

Further, with the flow applied to downlink positioning as an example, in some embodiments, before S501, the method may further include: S500: the receiving device (such as a terminal) receives configuration information of the set signal (such as the PRS) transmitted by an LMF entity, so that the receiving device receives the PRS transmitted by the transmitting device according to the configuration information.

Figure 6:
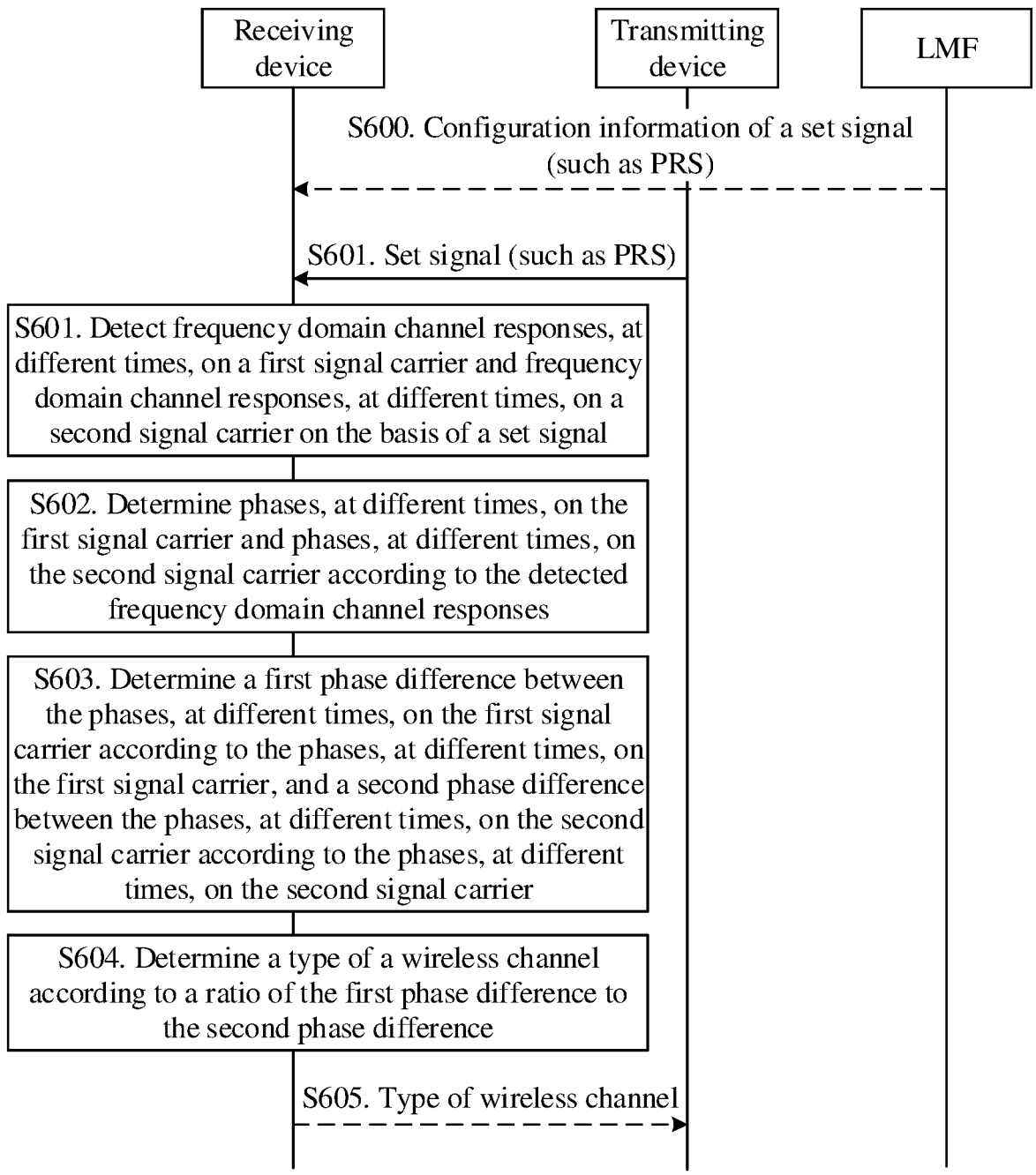
FIGS. 6-10 each are a schematic flowchart of a method for detecting a type of a wireless channel on the basis of a temporal difference between phase measurements, at different times, of a carrier phase according to an embodiment of the present disclosure.

With reference to FIG. 6, a schematic flowchart of a method for detecting a type of a wireless channel on the basis of a temporal difference between phase measurements, at different times, of a carrier phase according to an embodiment of the present disclosure.

If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The flow is executed by the receiving device. Specifically, the flow may be executed by a receiver in the receiving device.

As shown in FIG. 6, the flow may include the following steps.

S601: the receiving device detects frequency domain channel responses, at different times, on a first signal carrier and frequency domain channel responses, at different times, of a second signal carrier on the basis of a set signal.

In some embodiments, the first signal carrier and the second signal carrier include: a first sub-carrier and a second sub-carrier of the same carrier. For example, the receiving device detects frequency domain channel responses, at a first time (such as time 0) and a second time (such as time t), on a first sub-carrier and frequency domain channel responses, at the first time (such as time 0) and the second time (such as time t), on a second sub-carrier on the basis of a set signal, the first sub-carrier and the second sub-carrier being on the same carrier.

In some other embodiments, the first signal carrier and the second signal carrier include: a first carrier and a second carrier received by the same antenna. For example, the receiving device detects frequency domain channel responses, at a first time (such as time 0) and a second time (such as time t), on a first carrier and frequency domain channel responses, at the first time (such as time 0) and the second time (such as time t), on a second carrier on the basis of a set signal, the first carrier and the second carrier being received by the same antenna.

In yet other embodiments, the first signal carrier and the second signal carrier include: a first carrier received by a first antenna and a second carrier received by a second antenna. For example, the receiving device detects frequency domain channel responses, at a first time (such as time 0) and a second time (such as time t), on a first carrier received by a first antenna, and frequency domain channel responses, at the first time (such as time 0) and the second time (such as time t), on a second carrier received by a second antenna on the basis of a set signal.

The set signal may be the PRS.

S602: the receiving device determines phases, at different times, on the first signal carrier and phases, at different times, on the second signal carrier according to the frequency domain channel responses detected in S601.

If in S601, the receiving device detects the frequency domain channel responses, at the first time and the second time, of the first sub-carrier and the frequency domain channel responses, at the first time and the second time, of the second sub-carrier, in S602, the corresponding phases are determined according to the frequency domain channel response, at the first time, of the first sub-carrier, the frequency domain channel response, at the second time, of the first sub-carrier, the frequency domain channel response, at the first time, of the second sub-carrier, and the frequency domain channel response, at the second time, of the second sub-carrier, respectively.

If in S601, the receiving device detects the frequency domain channel responses, at the first time and the second time, of the first carrier and the frequency domain channel responses, at the first time and the second time, of the second carrier, in S602, the corresponding phases are determined according to the frequency domain channel response, at the first time, of the first carrier, the frequency domain channel response, at the second time, of the first carrier, the frequency domain channel response, at the first time, of the second carrier, and the frequency domain channel response, at the second time, of the second carrier, respectively.

S603: the receiving device determines a first phase difference between the phases, at different times, on the first signal carrier according to the phases, at different times, on the first signal carrier, and a second phase difference between the phases, at different times, on the second signal carrier according to the phases, at different times, on the second signal carrier.

The first phase difference is phase($H1_k(t)$)−phase($H1_k(0)$).

The second phase difference is phase($H2_k(t)$)−phase($H2_k(0)$).

$H1_k(t)$ denotes the frequency domain channel response, detected on the basis of the set signal at time t, on the first signal carrier, $H1_k(0)$ denotes the frequency domain channel response, detected on the basis of the set signal at time 0, on the first signal carrier, $H2_k(t)$ denotes the frequency domain channel response, detected on the basis of the set signal at time t, on the second signal carrier, $H2_k(0)$ denotes the frequency domain channel response, detected on the basis of the set signal at time 0, on the second signal carrier, phase($H1_k(t)$) denotes a phase corresponding to $H1_k(t)$, phase($H1_k(0)$) denotes a phase corresponding to $H1_k(0)$, phase($H2_k(t)$) denotes a phase corresponding to $H2_k(t)$, and phase($H2_k(0)$) denotes a phase corresponding to $H2_k(0)$. t denotes a time corresponding to an index of an OFDM symbol, and is set as a real number greater than zero.

S604: the receiving device determines the type of the wireless channel according to a ratio of the first phase difference to the second phase difference.

The type of the wireless channel includes line of sight transmission or non-line of sight transmission.

In the step, the receiving device may calculate the ratio of the first phase difference to the second phase difference through the following formula:

$$\frac{\text{phase}(H1_k(t)) - \text{phase}(H1_k(0))}{\text{phase}(H2_k(t)) - \text{phase}(H2_k(0))}. \quad (14)$$

In response to determining that the ratio described above is within a set range, the type of the wireless channel corresponding to the set signal is determined as the LOS transmission, otherwise the type of the wireless channel corresponding to the set signal is determined as the NLOS transmission.

The set range may be obtained in the following manner.

According to the phase difference at different times, the ratio on the different carriers may be:

$$\frac{\text{phase}(H1_k(t)) - \text{phase}(H1_k(0))}{\text{phase}(H2_k(t)) - \text{phase}(H2_k(0))} = \frac{(f_{c1} + k \cdot \Delta f_{scs}) * (\tau_0(t) - \tau_0(0))}{(f_{c2} + k \cdot \Delta f_{scs}) * (\tau_0(t) - \tau_0(0))} = \frac{(f_{c1} + k \cdot \Delta f_{scs})}{(f_{c2} + k \cdot \Delta f_{scs})}.$$

That is, an ideal threshold $Th_{perfect}$ is:

$$Th_{perfect} = \frac{(f_{c1} + k \cdot \Delta f_{scs})}{(f_{c2} + k \cdot \Delta f_{scs})}.$$

$\tau_0(t)$ denotes a transmission delay measured by the OFDM symbol at time t, $f_{c1}$ denotes a center frequency of the first carrier, $f_{c2}$ denotes a center frequency of the first carrier, and $\Delta f_{scs}$ denotes a sub-carrier interval.

In consideration of the influence of a noise, etc., the ideal threshold may be floated up or down by X % (X is greater than zero and less than 100), so as to serve as an effective threshold of the LOS channel, that is, the set range is $[Th_{perfect}*(1-X\%), Th_{perfect}*(1+X\%)]$, for example, X %=10%, 25%, or 30%.

Further, with the flow applied to downlink positioning as an example, in some embodiments, after S603, the method may further include: S605: the receiving device (such as a terminal) notifies the transmitting device (such as a base station) of the determined type of the wireless channel In the step, the receiving device may transmit indication information of the type of the wireless channel to the transmitting device, the indication information being configured for indicating whether the type of the wireless channel is the LOS transmission or the NLOS transmission.

Further, with the flow applied to downlink positioning as an example, in some embodiments, before S601, the method may further include: S600: the receiving device (such as the terminal) receives configuration information of the set signal (such as the PRS) transmitted by an LMF entity, so that the receiving device receives the PRS transmitted by the transmitting device according to the configuration information, and identifies the type of the wireless channel on the basis of the PRS.

By employing the above flow, the LOS channel and/or the NLOS channel may be identified on the basis of the ratio of phase differences, at different times, of the carrier phase, thereby effectively improving the precision of positioning solution. Further, in the flow described above, the ratio of the phase differences, at different times, of the carrier phase is determined on the basis of the detected frequency domain channel responses, so that a success rate of identifying the LOS channel and the NLOS channel may be ensured.

The implementation principle of the embodiments described above of the present disclosure is described below for a single-path channel, an equivalent two-path channel, and a multi-path channel according to a ratio of phase differences, at different times, of a carrier phases in different cases.

Carrier phase measurement equation: a phase-locked loop performs initial locking on a carrier phase signal at a time t=0, and the initial phase may be expressed as:

$$\theta_l^i(0) = (d_l^i(0) + c(\delta t^i(0) - \delta t_l(0)) + m_{l,\varphi}^i(0))/\lambda + (\theta^i(0) - \theta_l(0)) + N_l^i + w_{l,\theta}^i/\lambda.$$

Where $\theta_l^i$ denotes a measured carrier phase, in cycles, measured by a receiver l from a measurement signal transmitted by a transmitter i.

$\lambda$ is a wavelength, in meters, corresponding to a center frequency f of a corresponding carrier.

$\theta_l(0)$ is an initial phase, in cycles, of the receiver l.

$\theta^i(0)$ is an initial phase, in cycles, of the transmitter i.

$N_l^i$ is an unknown ambiguity of whole cycles, in cycles, of a response corresponding to the measured carrier phase $\theta_l^i$.

$m_{l,\theta}^i$ is a multi-path error, in meters, corresponding to the measured carrier phase $\theta_l^i$.

$w_{l,\theta}^i$ is a measurement error, in meters, of the measured carrier phase $\theta_l^i$.

l=(a, b), l=a denoting user equipment (UE) at an unknown position, and l=b denoting reference UE. i=(1, ..., M), M being the total number of transmitters.

It is to be noted that in consideration of scenarios with a high signal noise ratio (SNR), the influence from $w_{l,\theta}^i$ is ignored in the following analysis.

The measured carrier phase $\theta_a^i$ acquired by target UE a through the reference signal transmitted by a base station i (i=1, ..., m) is as shown in the following formula:

$$\theta_a^i = \mathrm{mod}(-2\pi(f_c + k\Delta f_{SCS})\Delta t_a^i + \mathrm{phase}(H_k), 2\pi)/2\pi.$$

(1) For the Single-Path LOS Channel

For an ideal single-path LOS channel:

$$H_k = \Sigma_{l=0}^{L-1} h_l e^{-j2\pi(f_c + k\Delta f_{SCS})\tau_l} e^{-j2\pi\phi_l *} = h_0 e^{-j2\pi(f_c + k\Delta f_{SCS})\tau_0} e^{-j2\pi\phi_0 *}.$$

$$\mathrm{phase}(H_k) = -(f_c + k\Delta f_{SCS})\tau_{0_a}^i - \phi_{0_a}^{*i}.$$

Considering that a phase is between (0,2*pi), that is, an expression of the phase at a current time is:

$$\theta_a^i = \mathrm{mod}(-2\pi(f_c + k\Delta f_{SCS})\Delta t_a^i - 2\pi(f_c + k\Delta f_{SCS})\tau_{0_a}^i - \phi_{0_a}^{*i}, 2\pi)/2\pi.$$

First, temporal difference processing (that is, a difference between measured phases between time t and time t=0) is performed, and then ratios between temporal differences of phase measurements on the different CCs are compared with one another.

In consideration of a processing solution in the presence of timing offset:

$$H1_k(t) = h_0 e^{-j2\pi(f_{c1} + k\cdot f_{scs})(\tau_0(t) + \Delta t)} e^{-j\phi_0 *(t)}$$

$$H2_k(t) = h_0 e^{-j2\pi(f_{c2} + k\cdot f_{scs})(\tau_0(t) + \Delta t)} e^{-j\phi_0 *(t)}$$

$$\theta_l^i(t) - \theta_l^i(0) = (d_l^i(t) - d_l^i(0)) + c((\delta t^i(t) - \delta t^i(0)) - (\delta t_l(t) - \delta t_l(0)))/\lambda + (m_{l,\varphi}^i(t) - m_{l,\varphi}^i(0))/\lambda).$$

where $$d_l^i(t) = (f_c + k\Delta f_{SCS})\tau_{0_a}^i(t)$$

$$d_l^i(0) = (f_c + k\Delta f_{SCS})\tau_{0_a}^i(0)$$

$$\delta t^i(t) = -(f_c + k\Delta f_{SCS})\Delta t_a^i(t) - \phi_{0_a}^{*i}(t)$$

$$\delta t^i(0) = -(f_c + k\Delta f_{SCS})\Delta t_a^i(0) - \phi_{0_a}^{*i}(0)$$

$$m_{l,\varphi}^i(t) = 0$$

$$m_{l,\varphi}^i(0) = 0.$$

it is assumed that $\Delta t_a^i(t) = \Delta t_a^i(0)$ and $\phi_{0_a}^{*i}(t) = \phi_{0_a}^{*i}(0)$, that is, from time 0 to time t, timing offset of UE a and base station i remains unchanged, and initial phases remain unchanged, so that $$(\delta t^i(t) - \delta t^i(0)) - (\delta t_l(t) - \delta t_l(0)) = 0$$

$$\theta_l^i(t) - \theta_l^i(0) = (d_l^i(t) - d_l^i(0)) = (f_c + k\Delta f_{SCS}) * (\tau_{0_a}^i(t) - \tau_{0_a}^i(0)).$$

A ratio of phase differences at different times on the different CCs may be:

$$\frac{\mathrm{phase}(H1_k(t)) - \mathrm{phase}(H1_k(0))}{\mathrm{phase}(H2_k(t)) - \mathrm{phase}(H2_k(0))} = \frac{(f_{c1} + k\cdot\Delta f_{scs}) * (\tau_{0_a}^i(t) - \tau_{0_a}^i(0))}{(f_{c2} + k\cdot\Delta f_{scs}) * (\tau_{0_a}^i(t) - \tau_{0_a}^i(0))} = \frac{(f_{c1} + k\cdot\Delta f_{scs})}{(f_{c2} + k\cdot\Delta f_{scs})}.$$

That is, an ideal threshold is as follows:

$$Th_{perfect} = \frac{(f_{c1} + k \cdot \Delta f_{scs})}{(f_{c2} + k \cdot \Delta f_{scs})}.$$

In consideration of the influence of a noise, etc., the ideal threshold may be floated up or down by X %, so as to serve as an effective threshold of the LOS channel, that is, the set range is [$Th_{perfect}$*(1−X %), $Th_{perfect}$*(1+X %)], for example, X %=10%, 25%, or 30%. That is, when the calculated ratio of the phase differences described above is within the range, a current channel may be determined as the single-path LOS channel.

(2) For the Equivalent Two-Path LOS Channel (One Path of LOS Channel+One Path of NLOS Channel)

For the equivalent two-path channel (one path of LOS channel+one path of NLOS channel), it may be found that $$H_k = \sum_{l=0}^{1} h_l e^{-j2\pi(f_c + k\Delta f_{scs})\tau_l} e^{-j2\pi\phi_l^*} =$$

$$h_0 e^{-j2\pi(f_c + k\Delta f_{scs})\tau_0} e^{-1j2\pi\phi_0^*} + h_1 e^{-j2\pi(f_c + k\Delta f_{scs})\tau_1} e^{-j2\pi\phi_1^*}$$

$$\text{phase}(H_k) = \text{phase}(h_0 e^{-j2\pi(f_c + k\Delta f_{scs})\tau_0} e^{-1j2\pi\phi_0^*} + h_1 e^{-j2\pi(f_c + k\Delta f_{scs})\tau_1} e^{-j2\pi\phi_1^*}).$$

Considering that a phase is between (0,2*pi), that is, an expression of the phase at a current time is:

$\theta_a^i = \text{mod}(-(f_c + k\Delta f_{SCS})\Delta t_a^i + \text{phase}$
$(h_0 e^{-j2\pi(f_c + k\Delta f_{SCS})\tau_0} e^{-1j2\pi\phi_0^*} +$
$h_1 e^{-j2\pi(f_c + k\Delta f_{SCS})\tau_1} e^{-j2\pi\phi_1^*}).$ In consideration of temporal difference processing: that is, a difference between measured phases at time t and t=0 is analyzed.

In consideration of a processing solution in the presence of timing offset:

$H1_k(t) = h_1 e^{-j2\pi(f_{c1} + k \cdot \Delta f_{scs})(\tau_1(t) + \Delta t)} e^{-j2\pi\phi_{1*}(t)} +$
$h_2 e^{-j2\pi(f_{c1} + k \cdot \Delta f_{scs})\tau_2(t)} e^{-j2\pi\phi_{2*}(t)}$ $H2_k(t) = h_1 e^{-j2\pi(f_{c2} + k \cdot \Delta f_{scs})(\tau_1(t) + \Delta t)} e^{-j2\pi\phi_{1*}(t)} +$
$h_2 e^{-j2\pi(f_{c2} + k \cdot \Delta f_{scs})\tau_2(t)} e^{-j2\pi\phi_{2*}(t)}$ $\theta_i^i(t) - \theta_i^i(0) = (d_i^i(t) - d_i^i(0)) + c((\delta t^i(t) - \delta t^i(0)) - (\delta t_l(t) - \delta t_l(0)))/\lambda + (m_{l,\varphi}^i(t) - m_{l,\varphi}^i(0))/\lambda).$ where $d_l^i(t) = (f_c + k\Delta f_{SCS})\tau_{0_a}^i(t)$ $d_l^i(0) = (f_c + k\Delta f_{SCS})\tau_{0_a}^i(0)$ $\delta t^i(t) = -(f_c + k\Delta f_{SCS})\Delta t_a^i(t) - \phi_{0_a}^{*i}(t)$ $\delta t^i(0) = -(f_c + k\Delta f_{SCS})\Delta t_a^i(0) - \phi_{0_a}^{*i}(0)$ $m_{l,\varphi}^i(t) \neq 0$ $m_{l,\varphi}^i(0) \neq 0.$ it is assumed that $\Delta t_a^i(t) = \Delta t_a^i(0)$ and $\phi_{0_a}^{*i}(t) = \phi_{0_a}^{*i}(0)$, that is, from time 0 to time t, timing offset of UE a and base station i remains unchanged, and initial phases remain unchanged, so that $$(\delta t^i(t) - \delta t^i(0)) - (\delta t_l(t) - \delta t_l(0)) = 0$$

$\theta_i^j(t) - \theta_i^j(0) =$ $(d_i^j(t) - d_i^j(0)) = (f_c + k\Delta f_{scs}) * (\tau_{0_a}^i(t) - \tau_{0_a}^i(0)) + (m_{l,\varphi}^j(t) - m_{l,\varphi}^j(0))/\lambda).$ A ratio of phase differences at different times on the different CCs may be:

$$\frac{\text{phase}(H1_k(t)) - \text{phase}(H1_k(0))}{\text{phase}(H2_k(t)) - \text{phase}(H2_k(0))} =$$

$$\frac{(f_{c1} + k \cdot \Delta f_{scs}) * (\tau_{0_a}^i(t) - \tau_{0_a}^i(0)) + (m_{l,\varphi}^{i,f_{c1}}(t) - m_{l,\varphi}^{i,f_{c1}}(0))/\lambda}{(f_{c2} + k \cdot \Delta f_{scs}) * (\tau_{0_a}^i(t) - \tau_{0_a}^i(0)) + (m_{l,\varphi}^{i,f_{c2}}(t) - m_{l,\varphi}^{i,f_{c2}}(0))/\lambda} \neq$$

$$\frac{(f_{c1} + k \cdot \Delta f_{scs})}{(f_{c2} + k \cdot \Delta f_{scs})}.$$

A fixed value is unobtainable.

An ideal threshold is defined as follows:

$$Th_{perfect} = \frac{(f_{c1} + k \cdot \Delta f_{scs})}{(f_{c2} + k \cdot \Delta f_{scs})}.$$

In consideration of the influence of a noise, etc., the ideal threshold may be floated up or down by X %, so as to serve as an effective threshold of the LOS channel, that is, the set range is [$Th_{perfect}$*(1−X %), $Th_{perfect}$*(1+X %)], for example, X %=10%, 25%, or 30%.

After temporal difference processing is performed repeatedly, a metric value $$\frac{\text{phase}(H1_k(t)) - \text{phase}(H1_k(0))}{\text{phase}(H2_k(t)) - \text{phase}(H2_k(0))}$$

of the NLOS channel generally will not fall within the interval [$Th_{perfect}$*(1−X %), $Th_{perfect}$*(1+X %)].

Therefore, according to the principle described above, the LOS channel and the NLOS channel may be identified on the basis of the ratio of the phase differences, at different times, of the carrier phase.

Figure 7:
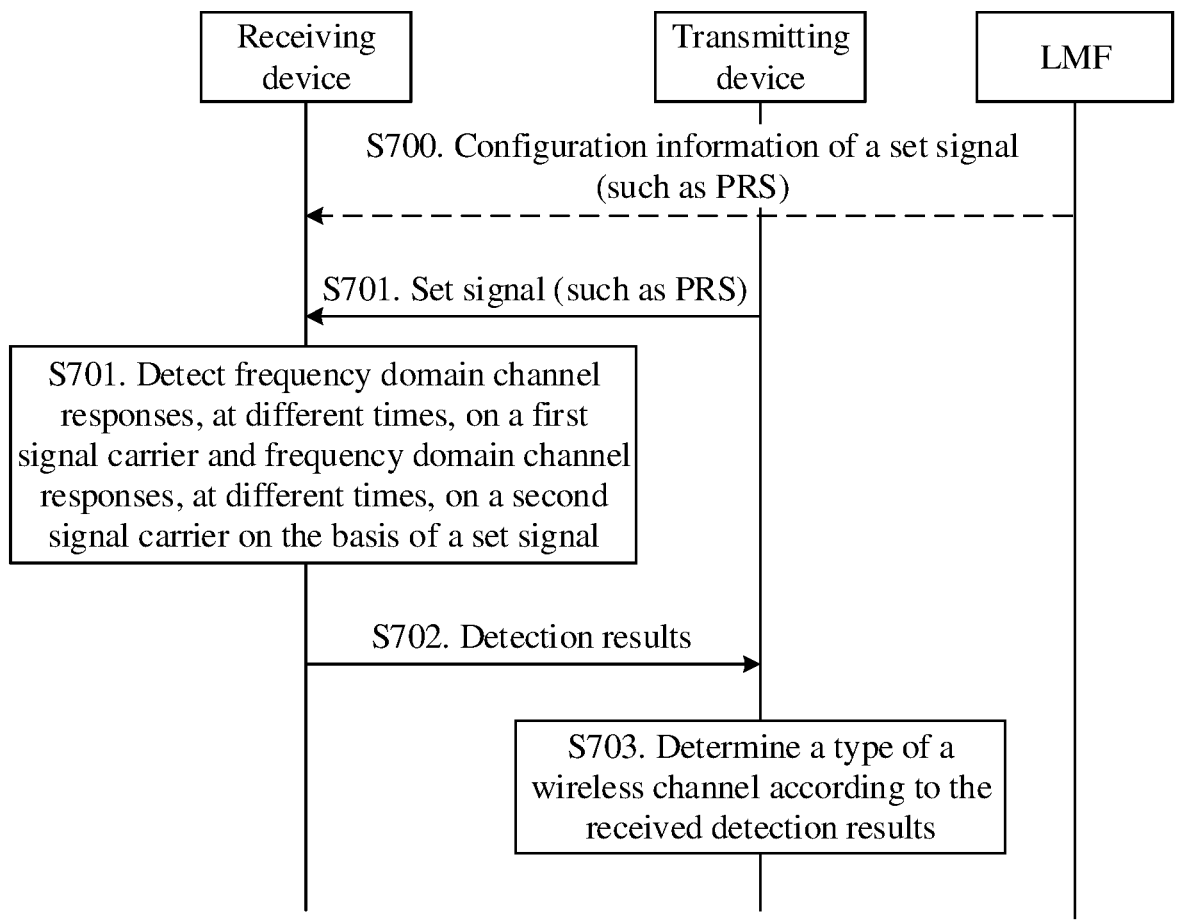

With reference to FIG. 7, a schematic flowchart of another method for detecting a type of a wireless channel on the basis of a temporal difference between phase measurements, at different times, of a carrier phase according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 7, the flow may include the following steps.

S701: the receiving device detects frequency domain channel responses, at different times, on a first signal carrier and frequency domain channel responses, at different times, of a second signal carrier on the basis of a set signal.

Reference may be made to S601 in the flow shown in FIG. 6 for a specific implementation method of the step.

S702: the receiving device transmits detection results to a transmitting device of the set signal.

The detection results are configured for determining the type of the wireless channel, and include the frequency domain channel responses detected in S601.

The detection results are configured for determining the type of the wireless channel, and include the frequency domain channel responses detected in S701.

The detection results may include: frequency domain channel responses, detected on the basis of the set signal, on a first sub-carrier, a second sub-carrier, a third sub-carrier, and a fourth sub-carrier, and indexes of the first sub-carrier, the second sub-carrier, the third sub-carrier, and the fourth sub-carrier.

Further, if the receiving device measures frequency domain channel responses on the different carriers (such as a first carrier and a second carrier), the detection results may further include: an index of the first carrier and an index of the second carrier. If the receiving device measures frequency domain channel responses of signals received by different receiving antennas (such as a first antenna and a second antenna), the detection results may further include: an index of the first antenna and an index of the second antenna.

S703: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 6, which will not be repeated herein.

Further, with the flow applied to downlink positioning as an example, in some embodiments, before S701, the method may further include: S700: the receiving device (such as a terminal) receives configuration information of the set signal (such as the PRS) transmitted by an LMF entity, so that the receiving device receives the PRS transmitted by the transmitting device according to the configuration information.

Figure 8:
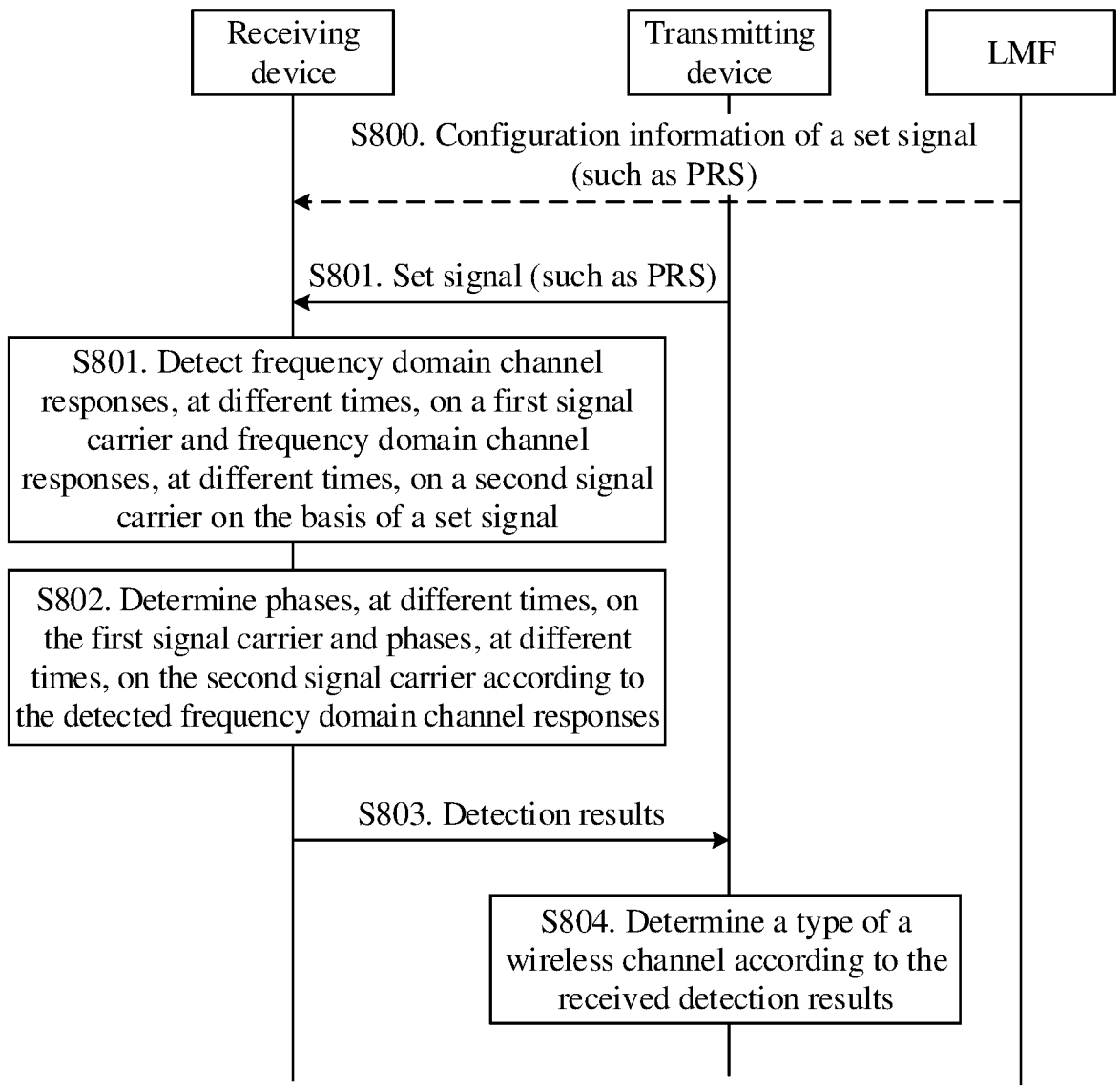

With reference to FIG. 8, a schematic flowchart of another method for detecting a type of a wireless channel on the basis of a temporal difference between phase measurements, at different times, of a carrier phase according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 8, the flow may include: S801: the receiving device detects frequency domain channel responses, at different times, on a first signal carrier and frequency domain channel responses, at different times, of a second signal carrier on the basis of a set signal.

Reference may be made to S601 in the flow shown in FIG. 6 for a specific implementation method of the step.

S802: the receiving device determines phases, at different times, on the first signal carrier and phases, at different times, on the second signal carrier according to the frequency domain channel responses detected in S801.

Reference may be made to S602 in the flow shown in FIG. 6 for a specific implementation method of the step.

S803: the receiving device transmits detection results to a transmitting device of the set signal.

The detection results are configured for determining the type of the wireless channel.

In some embodiments, the detection results include the phases determined in S802, and may further include indexes of a first carrier and a second carrier, or indexes of a first sub-carrier and a second sub-carrier, or indexes of a first antenna and a second antenna.

In some other embodiments, the detection results may include the frequency domain channel responses detected in S801. The detection results may further include indexes of a first carrier and a second carrier, or indexes of a first sub-carrier and a second sub-carrier, or indexes of a first antenna and a second antenna.

S804: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 6, which will not be repeated herein.

Further, with the flow applied to downlink positioning as an example, in some embodiments, before S801, the method may further include: S800: the receiving device (such as a terminal) receives configuration information of the set signal (such as the PRS) transmitted by an LMF entity, so that the receiving device receives the PRS transmitted by the transmitting device according to the configuration information.

Figure 9:
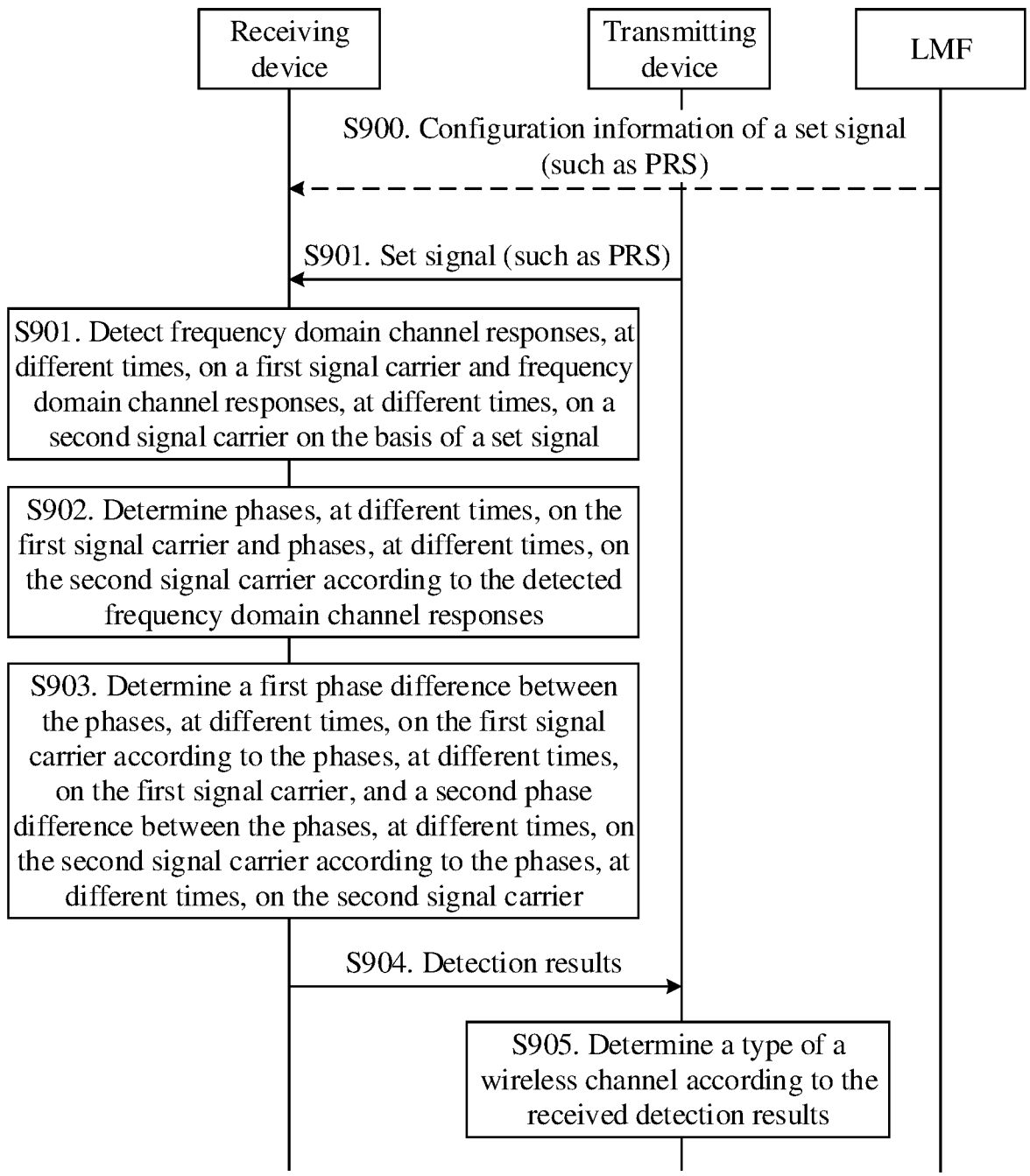

With reference to FIG. 9, a schematic flowchart of another method for detecting a type of a wireless channel on the basis of a temporal difference between phase measurements, at different times, of a carrier phase according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 9, the flow may include: S901: the receiving device detects frequency domain channel responses, at different times, on a first signal carrier and frequency domain channel responses, at different times, of a second signal carrier on the basis of a set signal.

Reference may be made to S601 in the flow shown in FIG. 6 for a specific implementation method of the step.

S902: the receiving device determines phases, at different times, on the first signal carrier and phases, at different times, on the second signal carrier according to the frequency domain channel responses detected in S901.

Reference may be made to S602 in the flow shown in FIG. 6 for a specific implementation method of the step.

S903: the receiving device determines a first phase difference between the phases, at different times, on the first signal carrier according to the phases, at different times, on the first signal carrier, and a second phase difference between the phases, at different times, on the second signal carrier according to the phases, at different times, on the second signal carrier.

Reference may be made to S603 in the flow shown in FIG. 6 for a specific implementation method of the step.

The receiving device may calculate phase differences as follows: a phase difference, between time t and time 0, on a first carrier: $\text{phase}(H1_k(t)) - \text{phase}(H1_k(0))$ and a phase difference, between time t and time 0, on a second carrier: $\text{phase}(H2_k(t)) - \text{phase}(H2_k(0))$.

S904: the receiving device transmits detection results to a transmitting device of the set signal.

The detection results are configured for determining the type of the wireless channel.

In some embodiments, the detection results include the phase differences determined in S903, and may further include indexes of the first carrier and the second carrier, or indexes of a first sub-carrier and a second sub-carrier, or indexes of a first antenna and a second antenna.

In some other embodiments, the detection results include the phases determined in S902, and may further include indexes of the first carrier and the second carrier, or indexes of a first sub-carrier and a second sub-carrier, or indexes of a first antenna and a second antenna.

In yet other embodiments, the detection results may include the frequency domain channel responses detected in S901. The detection results may further include indexes of the first carrier and the second carrier, or indexes of a first sub-carrier and a second sub-carrier, or indexes of a first antenna and a second antenna.

S905: the transmitting device determines the type of the wireless channel according to the received detection results.

A method for the transmitting device to determine the type of the wireless channel according to the received detection results is the same as the method for the receiving device to determine the type of the wireless channel corresponding to the set signal in the flow shown in FIG. 6, which will not be repeated herein.

Further, with the flow applied to downlink positioning as an example, in some embodiments, before S901, the method may further include: S900: the receiving device (such as a terminal) receives configuration information of the set signal (such as the PRS) transmitted by an LMF entity, so that the receiving device receives the PRS transmitted by the transmitting device according to the configuration information.

Figure 10:
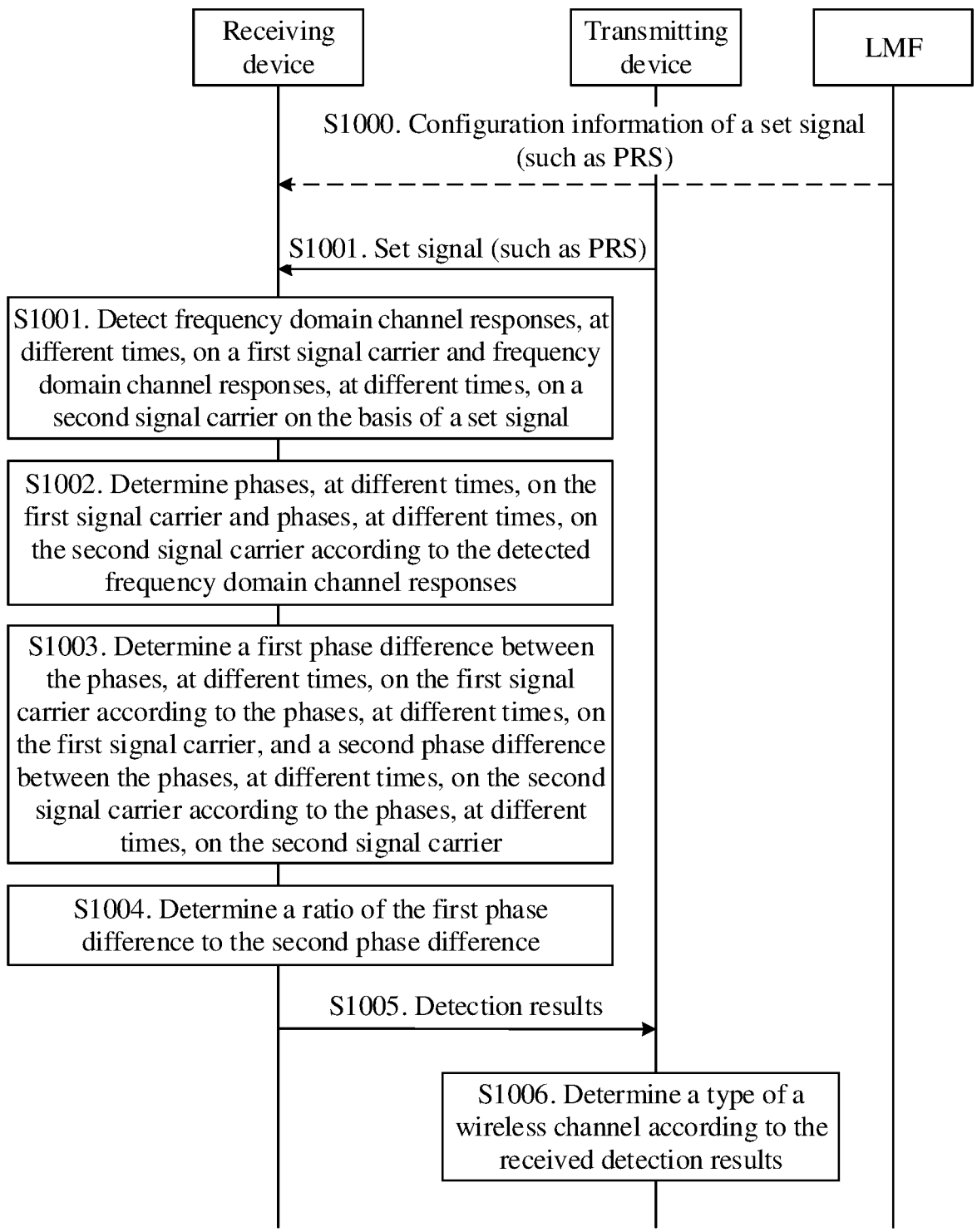

With reference to FIG. 10, a schematic flowchart of another method for detecting a type of a wireless channel on the basis of a temporal difference between phase measurements, at different times, of a carrier phase according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 10, the flow may include the following steps.

S1001: the receiving device detects frequency domain channel responses, at different times, on a first signal carrier and frequency domain channel responses, at different times, of a second signal carrier on the basis of a set signal.

Reference may be made to S601 in the flow shown in FIG. 6 for a specific implementation method of the step.

S1002: the receiving device determines phases, at different times, on the first signal carrier and phases, at different times, on the second signal carrier according to the frequency domain channel responses detected in S1001.

Reference may be made to S602 in the flow shown in FIG. 6 for a specific implementation method of the step.

S1003: the receiving device determines a first phase difference between the phases, at different times, on the first signal carrier according to the phases, at different times, on the first signal carrier, and a second phase difference between the phases, at different times, on the second signal carrier according to the phases, at different times, on the second signal carrier.

Reference may be made to S603 in the flow shown in FIG. 6 for a specific implementation method of the step.

The receiving device may calculate phase differences as follows: a phase difference, between time t and time 0, on a first carrier: $phase(H1_k(t))-phase(H1_k(0))$ and a phase difference, between time t and time 0, on a second carrier: $phase(H2_k(t))-phase(H2_k(0))$.

S1004: the receiving device determines a ratio of the first phase difference to the second phase difference according to the phase differences determined in S1003.

Reference may be made to S604 in the flow shown in FIG. 6 for a specific implementation method of the step.

S1005: the receiving device transmits detection results to a transmitting device of the set signal.

The detection results are configured for determining the type of the wireless channel.

In some embodiments, the detection results include the ratio determined in S1004, and may further include indexes of the first carrier and the second carrier, or indexes of a first sub-carrier and a second sub-carrier, or indexes of a first antenna and a second antenna.

In some other embodiments, the detection results include the phase differences determined in S1003, and may further include indexes of the first carrier and the second carrier, or indexes of a first sub-carrier and a second sub-carrier, or indexes of a first antenna and a second antenna.

In yet other embodiments, the detection results include the phases determined in S1002, and may further include indexes of the first carrier and the second carrier, or indexes of a first sub-carrier and a second sub-carrier, or indexes of a first antenna and a second antenna.

In still other embodiments, the detection results may include the frequency domain channel responses detected in S1001. The detection results may further include indexes of the first carrier and the second carrier, or indexes of a first sub-carrier and a second sub-carrier, or indexes of a first antenna and a second antenna.

S1006: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 6, which will not be repeated herein.

Further, with the flow applied to downlink positioning as an example, in some embodiments, before S1001, the method may further include: S1000: the receiving device (such as a terminal) receives configuration information of the set signal (such as the PRS) transmitted by an LMF entity, so that the receiving device receives the PRS transmitted by the transmitting device according to the configuration information.

Figure 11:
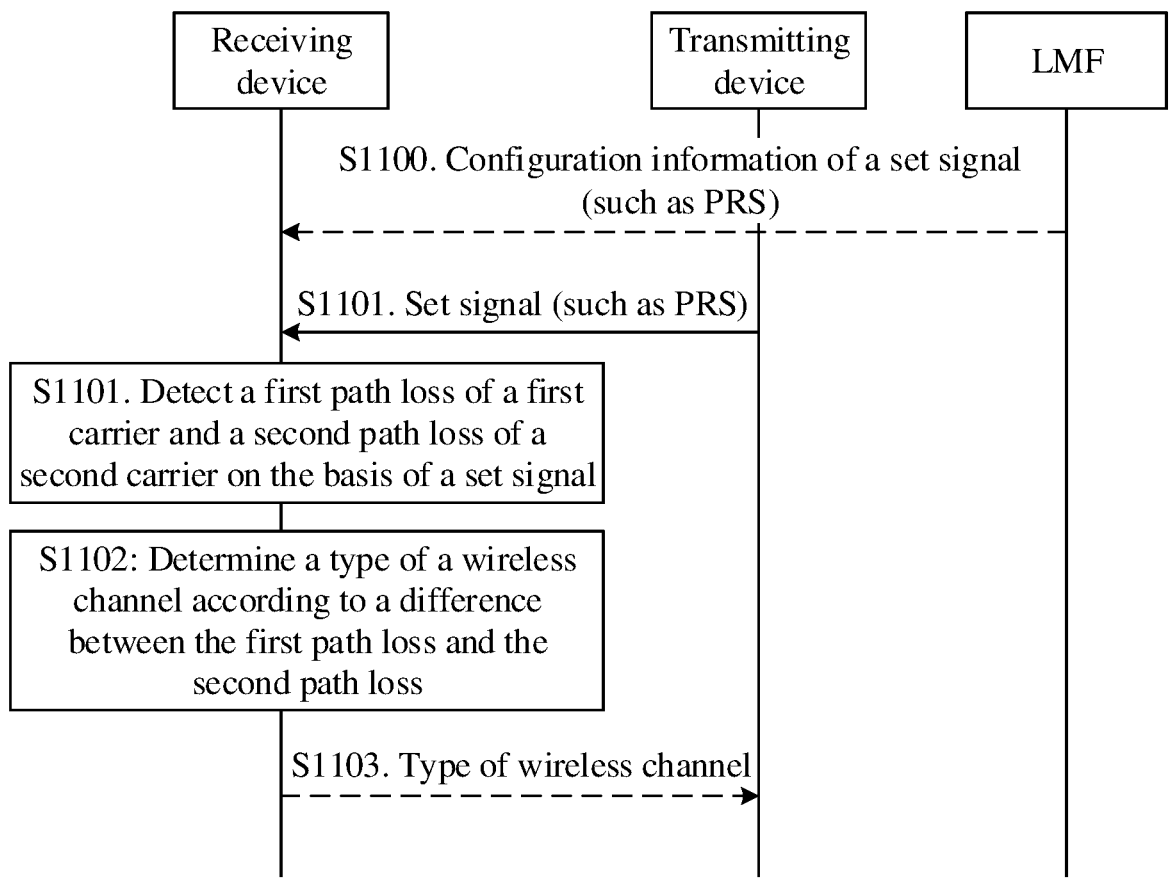
FIGS. 11-12 each are a schematic flowchart of a method for detecting a type of a wireless channel on the basis of a carrier path loss according to an embodiment of the present disclosure.

With reference to FIG. 11, a schematic flowchart of a method for detecting a type of a wireless channel on the basis of a carrier path loss according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 11, the flow may include the following steps.

S1101: the receiving device detects a first path loss of a first carrier and a second path loss of a second carrier on the basis of a set signal.

The set signal may be the PRS.

According to the protocol TR38.901, path losses (PLs) of an LOS channel and an NLOS channel are related to frequency points. Table 1 shows a PL formula in an indoor office scenario.

TABLE 1

| | | PL formula for indoor channel (Table 7.4.1-1 of protocol TR38.901) | | |
|---|---|---|---|---|
| Scenario | Line of sight/non-line of sight | Path Loss (dB) (Frequency $f_c$: GHz; Distance: m) | Shadow fading criteria (dB) | Applicable range and antenna height default (m) |
| Indoor office | Line of sight | $PL_{InH-LOS} = 32.4 + 17.3\log_{10}(d_{3D}) + 20\log_{10}(f_c)$ | $\sigma_{SF} = 3$ | $1\text{ m} \leq d_{3D} \leq 150\text{ m}$ |
| | Non-line of sight | $PL_{InH-NLOS} = \max(PL_{InH-LOS}, PL'_{InH-NLOS})$ $PL'_{InH-NLOS} = 38.3\log_{10}(d_{3D}) + 17.30 + 24.9\log_{10}(f_c)$ | $\sigma_{SF} = 8.03$ | $1\text{ m} \leq d_{3D} \leq 150\text{ m}$ |

$d_{3D}$ denotes a 3-dimension (3D) distance between UE and a base station.

Certainly, other methods may also be used to determine a path loss, which is not limited in the embodiments of the present disclosure.

S1102: the receiving device determines the type of the wireless channel according to a difference between the first path loss and the second path loss.

The type of the wireless channel includes LOS transmission or NLOS transmission.

In the step, if the difference between the path loss (that is, the first path loss) of the first carrier and the path loss (that is, the second path loss) of the second carrier is less than a set threshold, the type of the wireless channel is determined as the LOS transmission, otherwise the type of the wireless channel is determined as the NLOS transmission.

The set threshold may be expressed as TH_LOS_NLOS+ delta_PL, where TH_LOS_NLOS=PL1−PL2=20*log 10($f_{c1}/f_{c2}$) denotes a path loss difference under an ideal LOS channel, and delta_PL denotes an allowable path loss difference error. $f_{c1}$ and $f_{c2}$ are center frequencies of two carriers, respectively.

In other embodiments of the present disclosure, the receiving device may transmit the path loss, detected on the first carrier, of the set signal and the path loss, detected on the second carrier, of the set signal to a transmitting device of the set signal as detection results, and the transmitting device determines the type of the wireless channel according to the detection results. A specific implementation method for the transmitting device to determine the type of the wireless channel according to the detection results is the same as the corresponding processing steps of the receiving device in FIG. 11. Further, the detection results described above may further include: indexes of the first carrier and the second carrier, and/or indexes of a first antenna and a second antenna.

In other embodiments of the present disclosure, the receiving device may transmit the determined difference between the path loss, on the first carrier, of the set signal and the path loss, on the second carrier, of the set signal as a detection result to a transmitting device of the set signal, and the transmitting device determines the type of the wireless channel according to the detection result. A specific implementation method for the transmitting device to determine the type of the wireless channel according to the detection results is the same as the corresponding processing steps of the receiving device in FIG. 11. Further, the detection results described above may further include: indexes of the first carrier and the second carrier, and/or indexes of a first antenna and a second antenna.

Further, with the flow applied to downlink positioning as an example, in some embodiments, after S1102, the method may further include: S1103: the receiving device (such as a terminal) notifies the transmitting device (such as a base station) of the determined type of the wireless channel.

In the step, the receiving device may transmit indication information of the type of the wireless channel to the transmitting device, the indication information being configured for indicating whether the type of the wireless channel is the LOS transmission or the NLOS transmission.

Further, with the flow applied to downlink positioning as an example, in some embodiments, before S1101, the method may further include: S1100: the receiving device (such as a terminal) receives configuration information of the set signal (such as the PRS) transmitted by an LMF entity, so that the receiving device receives the PRS transmitted by the transmitting device according to the configuration information.

By employing the above flow, the LOS channel and/or the NLOS channel may be identified on the basis of the carrier path loss, thereby effectively improving the precision of positioning solution.

Figure 12:
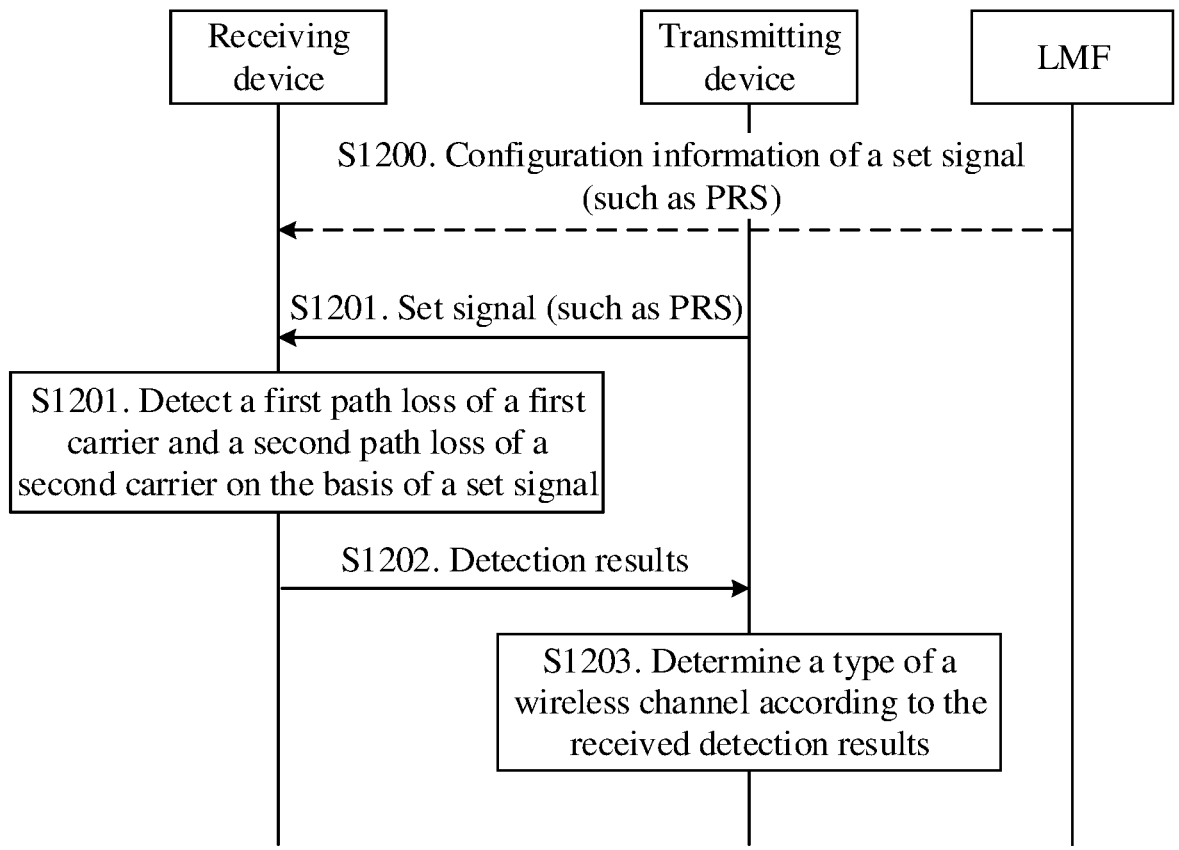

With reference to FIG. 12, a schematic flowchart of another method for detecting a type of a wireless channel on the basis of a carrier path loss according to an embodiment of the present disclosure is shown. If the flow is applied to downlink positioning, with determination of a type of a wireless channel by detecting a PRS as an example, a transmitting device may be a base station transmitting the PRS, and a receiving device may be a terminal receiving the PRS. If the flow is applied to uplink positioning, a transmitting device may be a terminal transmitting the PRS, and the receiving device may be a base station receiving the PRS. The receiving device in the flow may be replaced with a receiver in the receiving device.

As shown in FIG. 12, the flow may include the following steps.

S1201: the receiving device detects a first path loss of a first carrier and a second path loss of a second carrier on the basis of a set signal.

Reference may be made to S1101 in the flow shown in FIG. 11 for a specific implementation method of the step.

S1202: the receiving device transmits detection results to a transmitting device of the set signal.

The detection results are configured for determining the type of the wireless channel.

In some embodiments, the detection results include the first path loss of the first carrier and the second path loss of the second carrier determined in S1201, and may further include indexes of the first carrier and the second carrier, or indexes of a first sub-carrier and a second sub-carrier, or indexes of a first antenna and a second antenna.

In some other embodiments, the detection results include a difference between the first path loss and the second path loss of the set signal, and may further include indexes of the first carrier and the second carrier, or indexes of a first sub-carrier and a second sub-carrier, or indexes of a first antenna and a second antenna.

S1203: the transmitting device determines the type of the wireless channel according to the received detection results.

A method for the transmitting device to determine the type of the wireless channel according to the received detection results is the same as the method for the receiving device to determine the type of the wireless channel in the flow shown in FIG. 11, which will not be repeated herein.

Further, with the flow applied to downlink positioning as an example, in some embodiments, before S1201, the method may further include: S1200: the receiving device (such as a terminal) receives configuration information of the set signal (such as the PRS) transmitted by an LMF entity, so that the receiving device receives the PRS transmitted by the transmitting device according to the configuration information.

In some embodiments of the present disclosure, several methods for identifying a type of a channel described above may also be used in combination to improve the identification precision.

Specifically, the type of the wireless channel may be determined through at least two of a first detection method, a second detection method, or a third detection method. If the type of the wireless channel determined through at least two of the first detection method, the second detection method, or the third detection method is line of sight transmission, the type of the wireless channel is determined as the line of sight transmission. Alternatively, if the type of the wireless channel determined through at least two of the first detection method, the second detection method, or the third detection method is non-line of sight transmission, the type of the wireless channel is determined as the non-line of sight transmission.

The first detection method is the method for detecting a type of wireless channel on the basis of a carrier phase slope consistency, the specific implementation of which may be as shown in FIG. 2. The second detection method is the method for detecting a type of a wireless channel on the basis of a temporal difference between phase measurements, at different times, of a carrier phase, the specific implementation of which may be as shown in FIG. 6. The third detection method is the method for detecting a type of a wireless channel on the basis of a carrier path loss, the specific implementation of which may be as shown in FIG. 11.

In the embodiments described above of the present disclosure, the type of the channel may be identified on the basis of at least one of the carrier phase slope consistency, the ratio of the phase differences, at different times, of the carrier phase, or the carrier path loss, that is, the type of the channel is determined as the LOS transmission or the NLOS transmission, thereby effectively improving the precision of positioning solution.

On the basis of the same technical concept, an embodiment of the present disclosure further provides a communication device. The communication device may be the transmitting device in FIG. 2, such as the terminal.

Figure 13:
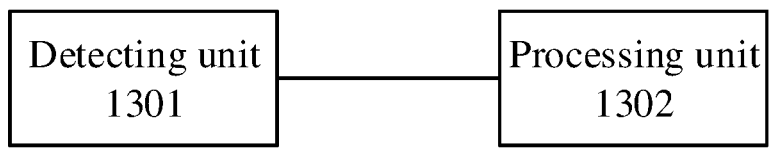
FIGS. 13-15 each are a schematic structural diagram of a communication device according to an embodiment of the present disclosure.

As shown in FIG. 13, the communication device may include: a detecting unit 1301 and a processing unit 1302.

The detecting unit 1301 is configured for detecting frequency domain channel responses of different sub-carriers of the same carrier or different carriers on the basis of a set signal.

The processing unit 1302 is configured for determining phases of correlation values, on the different sub-carriers of the same carrier or phases of correlation values, on the different carriers, of the frequency domain channel responses, and determining a type of a wireless channel according to slope consistency characteristics of the phases of the correlation values on the different sub-carriers of the same carrier or on the different carriers.

It is to be noted that the communication device described above according to the embodiment of the present disclosure may implement all method steps implemented by the transmitting device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the transmitting device in any one of the flows in FIGS. 3-5, such as the terminal.

Figure 14:
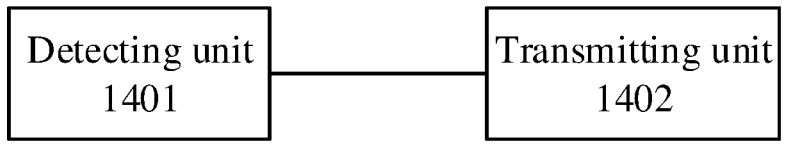

As shown in FIG. 14, the communication device may include: a detecting unit 1401 and a transmitting unit 1402.

The detecting unit 1401 is configured for detecting frequency domain channel responses of different sub-carriers of the same carrier or different carriers on the basis of a set signal.

The transmitting unit 1402 is configured for transmitting detection results to a transmitting device of the set signal, the detection results being configured for determining a type of a wireless channel and including at least one of the following: the frequency domain channel responses, detected on the basis of the set signal, of different sub-carriers of the same carrier or the frequency domain channel responses, detected on the basis of the set signal, of different carriers; phases, determined according to the frequency domain channel responses, of correlation values on the different sub-carriers of the same carrier or phases, determined according to the frequency domain channel responses, of correlation values on the different carriers; or slope consistency characteristics of the phases of the correlation values.

It is to be noted that the communication device described above according to the embodiment of the present disclosure may implement all method steps implemented by the transmitting device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the receiving device in any one of the flows in FIGS. 3-5, such as the base station.

Figure 15:
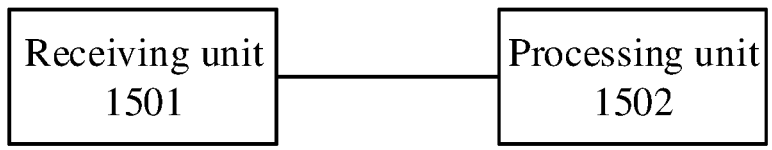

As shown in FIG. 15, the communication device may include: a receiving unit 1501 and a processing unit 1502.

The receiving unit 1501 is configured for receiving detection results, the detection results including: at least one of frequency domain channel responses, detected on the basis of a set signal, of different sub-carriers of the same carrier or frequency domain channel responses, detected on the basis of a set signal, of different carriers, phases, determined according to the frequency domain channel responses, of correlation values on the different sub-carriers of the same carrier or phases, determined according to the frequency domain channel responses, of correlation values on the different carriers, or slope consistency characteristics of the phases of the correlation values.

The processing unit 1502 is configured for determining a type of a wireless channel according to the detection results.

It is to be noted that the communication device described above according to the embodiment of the present disclosure may implement all method steps implemented by the receiving device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the transmitting device in FIG. 6, such as the terminal.

Figure 16:
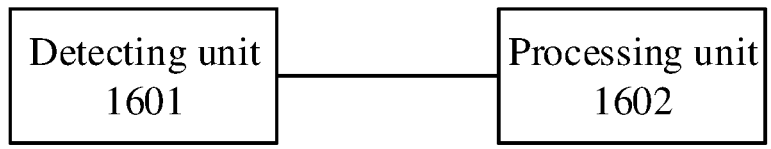
FIGS. 16-18 each are a schematic structural diagram of a communication device according to another embodiment of the present disclosure.

As shown in FIG. 16, the communication device may include: a detecting unit 1601 and a processing unit 1602.

The detecting unit 1601 is configured for detecting frequency domain channel responses, at different times, on a first signal carrier and frequency domain channel responses, at different times, on a second signal carrier on the basis of a set signal, the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna.

The processing unit 1602 is configured for determining phases, at different times, on the first signal carrier and phases, at different times, on the second signal carrier according to the frequency domain channel responses, determining a first phase difference between the phases, at different times, on the first signal carrier according to the phases, at different times, on the first signal carrier and a second phase difference between the phases, at different times, on the second signal carrier according to the phases, at different times, on the second signal carrier, and determining a type of a wireless channel according to a ratio of the first phase difference to the second phase difference, the type of the wireless channel including line of sight transmission or non-line of sight transmission.

It is to be noted that the communication device described above according to the embodiment of the present disclosure may implement all method steps implemented by the transmitting device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the transmitting device in FIGS. 7-10, such as the terminal.

Figure 17:
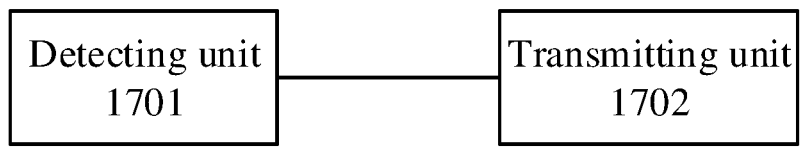

As shown in FIG. 17, the communication device may include: a detecting unit 1701 and a transmitting unit 1702.

The detecting unit 1701 is configured for detecting frequency domain channel responses, at different times, on a first signal carrier and frequency domain channel responses, at different times, on a second signal carrier on the basis of a set signal, the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna.

The transmitting unit 1702 is configured for transmitting detection results to a transmitting device of the set signal, the detection results being configured for determining a type of a wireless channel, the type of the wireless channel including line of sight transmission or non-line of sight transmission, and the detection results including at least one of the following: the frequency domain channel responses, detected on the basis of the set signal at different times, on the first signal carrier and the frequency domain channel responses, detected on the basis of the set signal at different times, of the second signal carrier; phases, at different times, on the first signal carrier, phases, at different times, on the second signal carrier, a first phase difference between the phases, at different times, on the first signal carrier, and a second phase difference, determined according to the phases at different times on the second signal carrier, between the phases, at different times, on the second signal carrier; or a ratio of the first phase difference to the second phase difference.

The first signal carrier and the second signal carrier include: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna.

It is to be noted that the communication device described above according to the embodiment of the present disclosure may implement all method steps implemented by the transmitting device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the receiving device in FIGS. 7-10, such as the base station.

Figure 18:
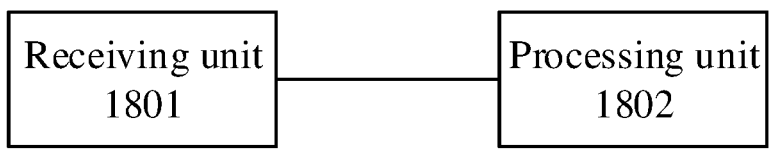

As shown in FIG. 18, the communication device may include: a receiving unit 1801 and a processing unit 1802.

The receiving unit is configured for receiving detection results, the detection results including at least one of frequency domain channel responses, detected on the basis of a set signal at different times, on a first signal carrier, frequency domain channel responses, detected on the basis of the set signal at different times, on a second signal carrier, phases, at different times, on the first signal carrier, phases, at different times, on the second signal carrier, a first phase difference between the phases, at different times, on the first signal carrier, a second phase difference, determined according to the phases at different times on the second signal carrier, between the phases, at different times, on the second signal carrier, or a ratio of the first phase difference to the second phase difference; the first signal carrier and the second signal carrier including: a first sub-carrier and a second sub-carrier of the same carrier, or a first carrier and a second carrier, the first carrier and the second carrier being carriers received by the same antenna, or, the first carrier being a carrier received by a first antenna, and the second carrier being a carrier received by a second antenna.

The processing unit 1802 is configured for determining a type of a wireless channel according to the detection results, the type of the wireless channel including line of sight transmission or non-line of sight transmission.

It is to be noted that the communication device described above according to the embodiment of the present disclosure may implement all method steps implemented by the receiving device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the transmitting device in FIG. 11, such as the terminal.

Figure 19:
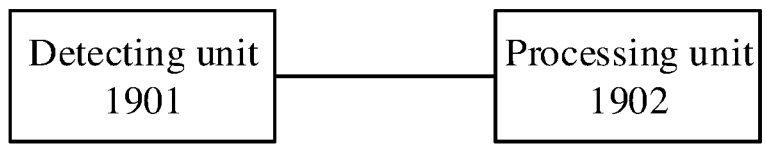
FIGS. 19-21 each are a schematic structural diagram of a communication device according to yet another embodiment of the present disclosure.

As shown in FIG. 19, the communication device may include: a detecting unit 1901 and a processing unit 1902.

The detecting unit 1901 is configured for detecting a first path loss of a first carrier and a second path loss of a second carrier on the basis of a set signal.

The processing unit 1902 is configured for determining a type of a wireless channel according to a difference between the first path loss and the second path loss, the type of the wireless channel including line of sight transmission or non-line of sight transmission.

It is to be noted that the communication device described above according to the embodiment of the present disclosure may implement all method steps implemented by the transmitting device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the transmitting device in FIG. 12, such as the terminal.

Figure 20:
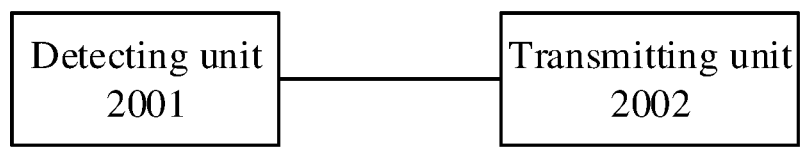

As shown in FIG. 20, the communication device may include: a detecting unit 2001 and a transmitting unit 2002.

The detecting unit 2001 is configured for detecting a first path loss of a first carrier and a second path loss of a second carrier on the basis of a set signal.

The transmitting unit 2002 is configured for transmitting detection results to a transmitting device of the set signal, the detection results being configured for determining a type of a wireless channel, the type of the wireless channel including line of sight transmission or non-line of sight transmission, and the detection results including the first path loss and the second path loss, and/or a difference between the first path loss and the second path loss.

It is to be noted that the communication device described above according to the embodiment of the present disclosure may implement all method steps implemented by the transmitting device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the receiving device in FIG. 12, such as the base station.

Figure 21:
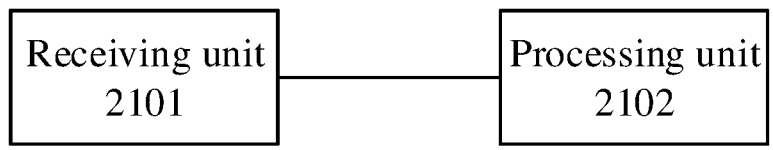

As shown in FIG. 21, the communication device may include: a receiving unit 2101 and a processing unit 2102.

The receiving unit 2101 is configured for receiving detection results, the detection results including a first path loss, detected on the basis of a set signal, of a first carrier and a second path loss, detected on the basis of a set signal, of a second carrier, and/or a difference between the first path loss and the second path loss.

The processing unit 2102 is configured for determining a type of a wireless channel according to the detection results, the type of the wireless channel including line of sight transmission or non-line of sight transmission.

It is to be noted that the communication device described above according to the embodiment of the present disclosure may implement all method steps implemented by the receiving device in the method embodiment described above, and realize the same technical effects. Accordingly, the same portions and beneficial effects as those in the method embodiment in the present embodiment will not be specifically repeated herein.

On the basis of the same technical concept, an embodiment of the present disclosure further provides a communication device. The communication device may be the transmitting device, such as the terminal.

The communication device may include a first determining unit, a second determining unit, and a third determining unit.

The first determining unit is configured for determining a type of a wireless channel through at least two of a first detection method, a second detection method, or a third detection method, the type of the wireless channel including line of sight transmission or non-line of sight transmission.

The second determining unit is configured for determining the type of the wireless channel as line of sight transmission in response to determining that the type of the wireless channel determined through at least two of the first detection method, the second detection method, or the third detection method is line of sight transmission, or, determining the type of the wireless channel as non-line of sight transmission in response to determining that the type of the wireless channel determined through at least two of the first detection method, the second detection method, or the third detection method is non-line of sight transmission.

The first detection method is the method for detecting a type of wireless channel on the basis of a carrier phase slope consistency, the specific implementation of which may be as shown in FIG. 2. The second detection method is the method for detecting a type of a wireless channel on the basis of a temporal difference between phase measurements, at different times, of a carrier phase, the specific implementation of which may be as shown in FIG. 6. The third detection method is the method for detecting a type of a wireless channel on the basis of a carrier path loss, the specific implementation of which may be as shown in FIG. 11.

On the basis of the same technical concept, an embodiment of the present disclosure further provides a communication device. The communication device may realize functions on a side of the transmitting device or the receiving device in the foregoing embodiment.

Figure 22:
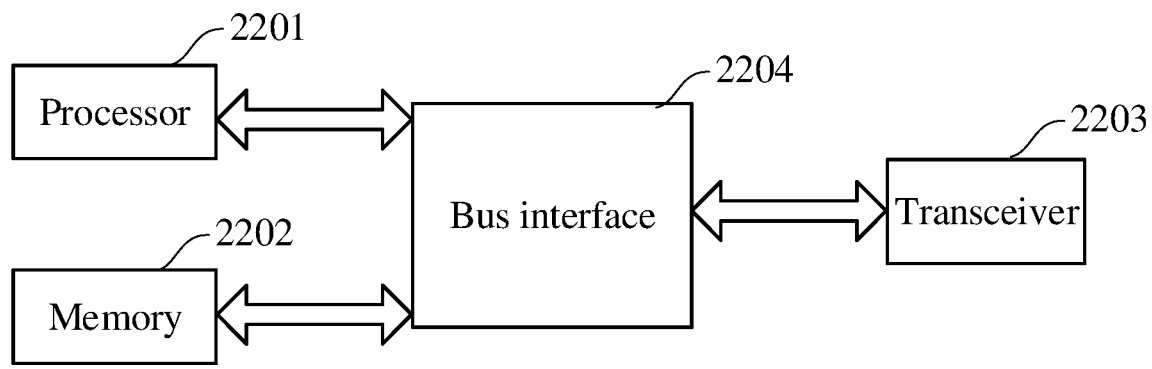
FIG. 22 is a schematic structural diagram of a communication device according to still another embodiment of the present disclosure.

With reference to FIG. 22, a schematic structural diagram of the communication device according to the embodiment of the present disclosure. As shown in FIG. 22, the communication device may include: a processor 2201, a memory 2202, a transceiver 2203, and a bus interface 2204.

The processor 2201 is configured for managing the bus architecture and general processing. The memory 2202 may store data used by the processor 2201 during operations. The transceiver 2203 is configured for receiving and transmitting data under the control of the processor 2201.

The bus architecture may include any number of interconnected buses and bridges, which are specifically linked together through various circuits of one or more processors represented by the processor 2201, and a memory represented by the memory 2202. The bus architecture may also link various other circuits, such as peripheral devices, voltage regulators, and power management circuits, which are well known in the art, so they will not be further described herein. The bus interface provides an interface. The processor 2201 is configured for managing the bus architecture and general processing. The memory 2202 may store data used by the processor 2201 during operations.

The flows disclosed in the embodiments of the present disclosure may be applied to the processor 2201, or implemented by the processor 2201. During implementation, all steps of a signal processing flow may be implemented through an integrated logic circuit of hardware in the processor 2201, or through instructions in the form of software. The processor 2201 may be a programmable logic device, such as a general-purpose processor, a digital signal processor, an application specific integrated circuit, or a field programmable gate array, a discrete gate or transistor logic device, or a discrete hardware assembly, and may implement or execute all the methods, steps, and logic blocks in the embodiments of the present disclosure. The general-purpose processor may be a microprocessor, any conventional processor, etc. The steps of the methods disclosed in combination with the embodiments of the present disclosure may be executed directly through a hardware processor, or by combining hardware and software modules in the processor with each other. The software module can be in a storage medium mature in the art, such as a random access memory, a flash memory, a read-only memory, a programmable read-only memory, or an electrically erasable programmable memory, and a register. The storage medium is in the memory 2202, and the processor 2201 reads information from the memory 2202 and completes steps of the signal processing flow in combination with hardware of the processor.

Specifically, the processor 2201 is configured for reading a computer instruction from the memory 2202, and executing the functions implemented by the transmitting device or the receiving device in the embodiments of the present disclosure.

It is to be noted that the communication device described above according to the embodiment of the present disclosure may implement all method steps implemented by the transmitting device or the receiving device in the method embodiment described above, and realize the same technical effects. Accordingly, the same portions and beneficial effects as those in the method embodiment in the present embodiment will not be specifically repeated herein.

An embodiment of the present disclosure further provides a computer-readable storage medium. The computer-readable storage medium stores a computer-executable instruction, and the computer-executable instruction is configured for causing a computer to execute the method executed by the transmitting device in the embodiment described above.

An embodiment of the present disclosure further describes a computer-readable storage medium. The computer-readable storage medium stores a computer-executable instruction, and the computer-executable instruction is configured for causing a computer to execute the method executed by the receiving device in the embodiment described above.

Those skilled in the art should understand that the embodiments of the present disclosure can be provided as methods, systems, or computer program products. Therefore, the present disclosure can employ full hardware embodiments, full software embodiments, or software and hardware combined embodiments. Moreover, the present disclosure can take the form of a computer program product that is implemented on one or more computer available storage media (including, but not limited to, a disk memory, a compact disk read-only memory (CD-ROM), an optical memory, etc.) that encompass computer available program codes.

The present disclosure is described with reference to flowcharts and/or block diagrams of the methods, devices (systems), and computer program products according to the present disclosure. It should be understood that each flow and/or block in the flowcharts and/or block diagrams and combinations of the flows and/or blocks in the flowcharts and/or block diagrams can be implemented through the computer program instructions. These computer program instructions can be provided for a general-purpose computer, a special-purpose computer, an embedded processor, or a processor of another programmable data processing device, to generate a machine. Therefore, the instructions executed by the computer or the processor of another programmable data processing device generate an apparatus for implementing a specified function in one or more flows in the flowcharts and/or in one or more blocks in the block diagrams.

These computer program instructions can also be stored in a computer-readable memory that can guide the computer or another programmable data processing device to work in a specific way. Therefore, the instructions stored in the computer-readable memory generate a product including an instruction apparatus. The instruction apparatus implements a specified function in one or more flows in the flowcharts and/or one or more blocks in the block diagrams.

These computer program instructions can be loaded onto a computer or another programmable data processing device, so that a series of operations and steps are executed on the computer or another programmable device, thereby generating computer-implemented processing. Therefore, the instructions executed on the computer or another programmable device provide steps for implementing a specified function in one or more flows of the flowcharts and/or one or more blocks in the block diagrams.

Obviously, those skilled in the art can make various amendments and variations to the present disclosure without departing from the spirit and scope of the present disclosure. In this way, it is intended that the present disclosure also encompass these amendments and variations if these amendments and variations to the present disclosure fall within the scope of the claims of the present disclosure and their equivalents.

What is claimed is:

1. A method for detecting a type of a wireless channel, comprising:
    detecting frequency domain channel responses of different carriers or different sub-carriers of the same carrier on the basis of a set signal;
    determining phases of correlation values, on the different sub-carriers of the same carrier or on the different carriers, of the frequency domain channel responses;
    transmitting detection results to a transmitting device of the set signal, wherein the detection results are used to determine the type of the wireless channel; or determining the type of the wireless channel according to slope consistency characteristics of the phases of the correlation values on the different sub-carriers of the same carrier or on the different carriers; wherein the type of the wireless channel comprises line of sight transmission or non-line of sight transmission, and the detection results comprise at least one of the frequency domain channel responses, the phases, or the slope consistency characteristics.

2. The method according to claim 1, wherein the detecting frequency domain channel responses of the different sub-carriers of the same carrier or the different carriers on the basis of the set signal comprises:

detecting frequency domain channel responses on at least a first sub-carrier, a second sub-carrier, a third sub-carrier, and a fourth sub-carrier on the basis of the set signal; wherein the first sub-carrier, the second sub-carrier, the third sub-carrier, and the fourth sub-carrier are on the same carrier; or, the first sub-carrier and the second sub-carrier are on a first carrier, the third sub-carrier and the sub-fourth carrier are on a second carrier, and the first carrier and the second carrier are carriers received by the same antenna, or, the first carrier is a carrier received by a first antenna, and the second carrier is a carrier received by a second antenna; and the determining phases of correlation values, on the different sub-carriers of the same carrier or phases of correlation values, on the different carriers, of the frequency domain channel responses comprises:

determining phases of correlation values on at least the first sub-carrier and the second sub-carrier according to frequency domain channel responses detected on at least the first sub-carrier and the second sub-carrier on the basis of the set signal; and determining phases of correlation values on at least the third sub-carrier and the fourth sub-carrier according to frequency domain channel responses detected on at least the third sub-carrier and the fourth sub-carrier on the basis of the set signal.

3. The method according to claim 2, wherein the determining the type of the wireless channel according to slope consistency characteristics of the phases of the correlation values on the different sub-carriers of the same carrier or the phases of the correlation values on the different carriers comprises:

determining a first first-order derivative, relative to an interval between the first sub-carrier and the second sub-carrier, of the phases of the correlation values on the first sub-carrier and the second sub-carrier according to the phases of the correlation values on the first sub-carrier and the second sub-carrier and the interval between the first sub-carrier and the second sub-carrier;

determining a second first-order derivative, relative to an interval between the third sub-carrier and the fourth sub-carrier, of the phases of the correlation values on the third sub-carrier and the fourth sub-carrier according to the phases of the correlation values on the third sub-carrier and the fourth sub-carrier and the interval between the third sub-carrier and the fourth sub-carrier;

determining the slope consistency characteristics of the phases of the correlation values on the different sub-carriers of the same carrier or the phases of the correlation values on the different carriers according to a relative difference between the first first-order derivative and the second first-order derivative; and determining the type of the wireless channel on the basis of the slope consistency characteristics.

4. The method according to claim 3, wherein:

the first first-order derivative satisfies a following formula: and $$\text{Derivative\_first\_order\_1} = \text{phase}(H1_{k_2} * H1_{k_1}^*)/(-2\pi (k_2-k_1) \cdot \Delta f_{scs})$$

the second first-order derivative satisfies a following formula:

$$\text{Derivative\_first\_order\_2} = \text{phase}(H1_{k_4} * H1_{k_3}^*)/(-2\pi (k_4-k_3) \cdot \Delta f_{scs})$$

wherein Derivative_first_order_1 denotes the first first-order derivative, Derivative_first_order_2 denotes the second first-order derivative, $H1_{k_1}$ denotes a frequency domain channel response detected on the first sub-carrier, $H1_{k_2}$ denotes a frequency domain channel response detected on the second sub-carrier, $H1_{k_3}$ denotes a frequency domain channel response detected on the third sub-carrier, $H1_{k_4}$ denotes a frequency domain channel response detected on the fourth sub-carrier, $k_1$ denotes an index of the first sub-carrier, $k_2$ denotes an index of the second sub-carrier, $k_3$ denotes an index of the third sub-carrier, $k_4$ denotes an index of the fourth sub-carrier, $\Delta f_{scs}$ denotes a sub-carrier interval, phase( ) denotes a function for calculating a phase, and P* denotes a conjugate of a variable P.

5. The method according to claim 3, wherein the determining the type of the wireless channel according to the slope consistency characteristics comprises:

in response to determining that the relative difference between the first first-order derivative and the second first-order derivative is less than a set threshold, determining the type of the wireless channel as line of sight transmission, otherwise, determining the type of the wireless channel as non-line of sight transmission.

6. The method according to claim 3, wherein the slope consistency characteristics in the detection results comprise:

the first first-order derivative and the second first-order derivative; or the relative difference between the first first-order derivative and the second first-order derivative.

7. The method according to claim 2, wherein the determining the type of the wireless channel according to slope consistency characteristics of the phases of the correlation values on the different sub-carriers of the same carrier or the phases of the correlation values on the different carriers comprises:

determining a first first-order derivative, relative to an interval between the first sub-carrier and the second sub-carrier, of the phases of the correlation values on the first sub-carrier and the second sub-carrier according to the phases of the correlation values on the first sub-carrier and the second sub-carrier, and the interval between the first sub-carrier and the second sub-carrier;

determining a second first-order derivative, relative to an interval between the third sub-carrier and the fourth sub-carrier, of the phases of the correlation values on the third sub-carrier and the fourth sub-carrier according to the phases of the correlation values on the third sub-carrier and the fourth sub-carrier, and the interval between the third sub-carrier and the fourth sub-carrier;

determining a second-order derivative, relative to an interval between corresponding sub-carriers, of the first first-order derivative and the second first-order derivative according to the first first-order derivative, the second first-order derivative, the interval between the first sub-carrier and the second sub-carrier, and the interval between the third sub-carrier and the fourth sub-carrier;

determining the slope consistency characteristics of the phases of the correlation values on the different sub-carriers of the same carrier or the phases of the correlation values on the different carriers according to the second-order derivative; and determining the type of the wireless channel on the basis of the slope consistency characteristics.

8. The method according to claim 7, wherein the first first-order derivative satisfies a following formula:

$$\text{Derivative\_first\_order\_1} = \text{phase}(H1_{k_2} * H1_{k_1}*)/(-2\pi(k_2-k_1)\cdot \Delta f_{scs})$$

the second first-order derivative satisfies a following formula: and $$\text{Derivative\_first\_order\_2} = \text{phase}(H1_{k_4} * H1_{k_3}*)/(-2\pi(k_4-k_3)\cdot \Delta f_{scs})$$

the second-order derivative satisfies a following formula:

$$\text{Derivative\_second\_order\_1} = (\text{Derivative\_first\_order\_2} - \text{Derivative\_first\_order\_1})/((k_4-k_3)-(k_2-k_1))$$

wherein Derivative_first_order_1 denotes the first first-order derivative, Derivative_first_order_2 denotes the second first-order derivative, Derivative_second_order_1 denotes the second-order derivative, $H1_{k_1}$ denotes a frequency domain channel response detected on the first sub-carrier, $H1_{k_2}$ denotes a frequency domain channel response detected on the second sub-carrier, $H1_{k_3}$ denotes a frequency domain channel response detected on the third sub-carrier, $H1_{k_4}$ denotes a frequency domain channel response detected on the fourth sub-carrier, $k_1$ denotes an index of the first sub-carrier, $k_2$ denotes an index of the second sub-carrier, $k_3$ denotes an index of the third sub-carrier, $k_4$ denotes an index of the fourth sub-carrier, $\Delta f_{scs}$ denotes a sub-carrier interval, phase( ) denotes a function for calculating a phase, and P* denotes a conjugate of a variable P.

9. The method according to claim 7, wherein the determining the type of the wireless channel according to the slope consistency characteristics comprises:

in response to determining that the second-order derivative is equal to zero or less than a set threshold, determining the type of the wireless channel as line of sight transmission, otherwise, determining the type of the wireless channel as non-line of sight transmission.

10. The method according to claim 7, wherein the slope consistency characteristics in the detection results comprise: the first first-order derivative and the second first-order derivative; and the detection results further comprise: indexes of the first sub-carrier, the second sub-carrier, the third sub-carrier, and the fourth sub-carrier; or the slope consistency characteristics in the detection results comprise: the second-order derivative.

11. A method for detecting a type of a wireless channel, comprising:

receiving detection results, wherein the detection results comprises: at least one of frequency domain channel responses, detected on the basis of a set signal, of different carriers or different sub-carriers of the same carrier, phases, determined according to the frequency domain channel responses, of correlation values on the different sub-carriers of the same carrier or on the different carriers, or slope consistency characteristics of the phases of the correlation values; and determining the type of the wireless channel according to the detection results, wherein the type of the wireless channel comprises line of sight transmission or non-line of sight transmission.

12. The method according to claim 11, wherein in a condition that the detection results comprise the frequency domain channel responses, detected on the basis of a set signal, of the different carriers or the different sub-carriers of the same carrier, the determining the type of the wireless channel according to the detection results comprises:

determining phases of correlation values on the different sub-carriers of the same carrier or on the different carriers according to the frequency domain channel responses;

determining slope consistency characteristics of the phases of the correlation values; and determining the type of the wireless channel according to the slope consistency characteristics of the phases of the correlation values.

13. The method according to claim 11, wherein in a condition that the detection results comprise phases, determined according to the frequency domain channel responses, of correlation values on the different sub-carriers of the same carrier or on the different carriers, the determining the type of the wireless channel according to the detection results comprises:

determining slope consistency characteristics of the phases of the correlation values according to the phases of the correlation values; and determining the type of the wireless channel according to the slope consistency characteristics of the phases of the correlation values.

14. The method according to claim 12, wherein the determining the slope consistency characteristics of the phases of the correlation values comprises:

determining a first first-order derivative, relative to an interval between a first sub-carrier and a second sub-carrier, of phases of correlation values on the first sub-carrier and the second sub-carrier according to the phases of the correlation values on the first sub-carrier and the second sub-carrier, and the interval between the first sub-carrier and the second sub-carrier;

determining a second first-order derivative, relative to an interval between a third sub-carrier and a fourth sub-carrier, of phases of correlation values on the third sub-carrier and the fourth sub-carrier according to the phases of the correlation values on the third sub-carrier and the fourth sub-carrier, and the interval between the third sub-carrier and the fourth sub-carrier; and determining the slope consistency characteristics of the phases of the correlation values on the different sub-carriers of the same carrier or the phases of the correlation values on the different carriers according to a relative difference between the first first-order derivative and the second first-order derivative.

15. The method according to claim 14, wherein the determining the type of the wireless channel according to the slope consistency characteristics of the phases of the correlation values comprises:

in response to determining that the relative difference between the first first-order derivative and the second first-order derivative is less than a set threshold, determining the type of the wireless channel as line of sight transmission, otherwise, determining the type of the wireless channel as non-line of sight transmission.

16. The method according to claim 12, wherein the determining the slope consistency characteristics of the phases of the correlation values comprises:

determining a first first-order derivative, relative to an interval between a first sub-carrier and a second sub-carrier, of phases of correlation values on the first sub-carrier and the second sub-carrier according to the phases of the correlation values on the first sub-carrier and the second sub-carrier, and the interval between the first sub-carrier and the second sub-carrier;

determining a second first-order derivative, relative to an interval between a third sub-carrier and a fourth sub-carrier, of phases of correlation values on the third sub-carrier and the fourth sub-carrier according to the phases of the correlation values on the third sub-carrier and the fourth sub-carrier, and the interval between the third sub-carrier and the fourth sub-carrier;

determining a second-order derivative, relative to an interval between corresponding sub-carriers, of the first first-order derivative and the second first-order derivative according to the first first-order derivative, the second first-order derivative, the interval between the first sub-carrier and the second sub-carrier, and the interval between the third sub-carrier and the fourth sub-carrier; and determining the slope consistency characteristics of the phases of the correlation values on the different sub-carriers of the same carrier or the phases of the correlation values on the different carriers according to the second-order derivative.

17. The method according to claim 16, wherein the determining the type of the wireless channel according to the slope consistency characteristics of the phases of the correlation values comprises:

in response to determining that the second-order derivative is equal to zero or less than a set threshold, determining the type of the wireless channel as line of sight transmission, otherwise, determining the type of the wireless channel as non-line of sight transmission.

18. The method according to claim 13, wherein the determining the slope consistency characteristics of the phases of the correlation values comprises:

determining a first first-order derivative, relative to an interval between a first sub-carrier and a second sub-carrier, of phases of correlation values on the first sub-carrier and the second sub-carrier according to the phases of the correlation values on the first sub-carrier and the second sub-carrier, and the interval between the first sub-carrier and the second sub-carrier;

determining a second first-order derivative, relative to an interval between a third sub-carrier and a fourth sub-carrier, of phases of correlation values on the third sub-carrier and the fourth sub-carrier according to the phases of the correlation values on the third sub-carrier and the fourth sub-carrier, and the interval between the third sub-carrier and the fourth sub-carrier; and determining the slope consistency characteristics of the phases of the correlation values on the different sub-carriers of the same carrier or the phases of the correlation values on the different carriers according to a relative difference between the first first-order derivative and the second first-order derivative.

19. A communication device, comprising: a processor, a memory, and a transceiver, wherein:

the transceiver is configured for receiving and transmitting data under a control of the processor, the memory is configured for storing a computer instruction, and the processor is configured for reading the computer instruction, so as to execute the method according to claim 1.

20. A communication device, comprising: a processor, a memory, and a transceiver, wherein:

the transceiver is configured for receiving and transmitting data under a control of the processor, the memory is configured for storing a computer instruction, and the processor is configured for reading the computer instruction, so as to execute the method according to claim 11.

* * * * *